(12) United States Patent
Taniguchi et al.

(10) Patent No.: US 8,759,467 B2
(45) Date of Patent: Jun. 24, 2014

(54) POLYESTER POLYOL, POLYURETHANE, OBTAINED USING THE SAME, PROCESS FOR PRODUCTION THEREOF, AND MOLDED POLYURETHANE

(75) Inventors: Takanori Taniguchi, Mie (JP); Haruhiko Kusaka, Kanagawa (JP); Youko Nakagawa, Mie (JP); Daisuke Hirooka, Mie (JP); Hisashi Nagahama, Mie (JP)

(73) Assignee: Mitsubishi Chemical Corporation, Tokyo (JP)

(*) Notice: Subject to any disclaimer, the term of this patent is extended or adjusted under 35 U.S.C. 154(b) by 0 days.

(21) Appl. No.: 13/458,234

(22) Filed: Apr. 27, 2012

(65) Prior Publication Data

US 2012/0277394 A1 Nov. 1, 2012

Related U.S. Application Data

(63) Continuation of application No. PCT/JP2010/069114, filed on Oct. 27, 2010.

(30) Foreign Application Priority Data

| Oct. 30, 2009 | (JP) | 2009-251097 |
| Jan. 29, 2010 | (JP) | 2010-019214 |
| Jan. 29, 2010 | (JP) | 2010-019217 |

(51) Int. Cl.
*C08G 18/46* (2006.01)
*C08G 18/50* (2006.01)
*C08G 18/61* (2006.01)

(52) U.S. Cl.
USPC .................. 528/28; 528/41; 528/60; 528/61; 528/76; 528/906

(58) Field of Classification Search
USPC .............................. 528/28, 41, 60, 61, 76, 906
See application file for complete search history.

(56) References Cited

U.S. PATENT DOCUMENTS

| 3,168,543 A | 2/1965 | Black et al. | |
| 4,647,643 A * | 3/1987 | Zdrahala et al. | ................. 528/28 |
| 4,916,199 A * | 4/1990 | Bandlish et al. | ................. 528/28 |
| 5,208,311 A * | 5/1993 | Schaefer et al. | ................. 528/13 |
| 2009/0247658 A1 | 10/2009 | Kobayashi et al. | |

FOREIGN PATENT DOCUMENTS

| CN | 1772785 A | 5/2006 |
| EP | 1 275 672 A1 | 1/2003 |
| JP | 03-227993 | 10/1991 |
| JP | 07-165868 | 6/1995 |
| JP | 2722006 B2 | 3/1998 |
| JP | 10-259577 | 9/1998 |
| JP | 2001-026748 | 1/2001 |
| JP | 2002-037842 | 2/2002 |
| JP | 2003-012760 | 1/2003 |
| JP | 2004-149771 | 5/2004 |
| JP | 2004-250683 | 9/2004 |
| JP | 2004-332126 | 11/2004 |

OTHER PUBLICATIONS

International Search Report issued Nov. 30, 2010 in PCT/JP2010/069114 filed Oct. 27, 2010.
Extended European Search Report issued Jun. 20, 2013 in Patent Application No. 10826791.5.
Combined Office Action and Search Report issued Aug. 9, 2013 in Chinese Application No. 201080049391.6 (With English Translation and English Translation of Category of Cited Documents).
Li Shaoxiong, et al., "Polyurethane Resin and Application Thereof", Chemical Industry Press, May 31, 2002, pp. 45-48.
Liu Yijun, "Polyurethane Raw Materials and Additives Handbook", Chemical Industry Press, Apr. 30, 2005, pp. 155-156.
The Second Office Action issued Dec. 14, 2013 in corresponding Chinese Application 201080049391.6, with English language translation.
Japanese Office Action Issued Mar. 18, 2014 with English translation (6pp.).

* cited by examiner

*Primary Examiner* — Rabon Sergent
(74) *Attorney, Agent, or Firm* — Oblon, Spivak, McClelland, Maier & Neustadt, L.L.P.

(57) ABSTRACT

A process for producing a polyurethane, which comprises using a polyester polyol (a-1), a polyether polyol (b), an isocyanate compound (c) and a chain extender (d) as a raw material to produce a polyurethane, wherein the polyester polyol (a-1) is a polyester polyol (a-1) obtained by forming an ester bond between either a carboxyl group of a polycarboxylic acid (i-1) having a polysiloxane framework and a plurality of carboxyl groups or an ester group of a polycarboxylic acid ester (i-2) having a polysiloxane framework and a plurality of ester groups, and a hydroxyl group of a polyether polyol (ii).

23 Claims, No Drawings

POLYESTER POLYOL, POLYURETHANE, OBTAINED USING THE SAME, PROCESS FOR PRODUCTION THEREOF, AND MOLDED POLYURETHANE

TECHNICAL FIELD

The present invention relates to a novel polyester polyol, a polyurethane obtained using the polyester polyol, a process for producing the polyurethane, and a molded polyurethane.

BACKGROUND ART

Polyurethanes and polyurethane-ureas are being applied in various fields, and are frequently used in applications such as elastic fibers among these. In particular, fibers having a polyurethane-urea structure have the property of being excellent in terms of elastic properties and extension recovery since a polyether polyol and a polyamine compound having high cohesive force were used as a soft-segment ingredient and a hard segment, respectively.

However, these polyurethane-based elastic fibers such as polyurethane and polyurethane-urea fibers have poor unwinding processability during spinning because the fibers have high stickiness to one another. Furthermore, since these elastic fibers have high frictional resistance, the fibers are apt to pose a problem, for example, that fiber breakage occurs at machines and devices disposed in processing steps, such as a spinning machine, warping machine, knitting machine, and guide.

Means for overcoming such problems by reducing frictional resistance between each machine or device disposed in processing steps and the fibers have been investigated. Examples thereof include a method in which a solid metal soap, an oil-soluble polymer, a higher fatty acid, an amino-modified silicone, or the like is added as a finishing oil to polyurethane-based elastic fibers, a method in which talc, silica, colloidal alumina, titanium oxide, or the like is dispersed as a smoothing agent in polyurethane-based elastic fibers, and a method in which a silicone diol or a silicone diamine is introduced into part of the main chain of a polyurethane (for example, patent document 1).

However, even when these methods are used, there have been problems, for example, that a sufficient sticking-preventive effect is not obtained and that the smoothing agent causes serious wear to the spinning machine, warping machine, knitting machine, guide, etc.

Furthermore, there is a problem that an oligomer which was contained in the fibers and has been extracted with the finishing oil ingredient in the warping or knitting step or solid or high-viscosity components of the finishing oil which have separated out as a solid or paste adhere in a large amount to the fibers, spinning machine, warping machine, knitting machine, guide, etc., thereby causing product staining and clogging of machines and tools. This problem has not been solved.

There hence has been a need for a process for producing a polyurethane having reduced tackiness and showing high unwinding processability, i.e., a polyurethane having high peeling property, without using the finishing oil or the smoothing agent.

Meanwhile, many reports have hitherto been made on use of a polysiloxane polyol as a raw material for a polyurethane. Examples thereof include a thermoplastic polyurethane having a high modulus of impact resilience and produced using a modified polysiloxane diol (patent document 2). Examples thereof further include elastic polyurethane fibers which give a soft and satisfactory sense of wear and which were produced using an ether-modified silicone (patent document 3).

However, the thermoplastic polyurethane described in patent document 2 has had a problem that this polyurethane is insufficient in flexibility because the modified polysiloxane diol was used in an exceedingly large amount with respect to the amount of the other polyols.

The process described in patent document 3 has had a problem that since a polyurethane is produced and an ether-modified silicone is thereafter added to the polyurethane obtained, the ether-modified silicone is apt to separate from the surface of the fibers. In addition, there has been a problem that even when it is attempted to react the ether-modified silicone during polyurethane production, the ether-modified silicone shows insufficient compatibility with other polyols and a homogeneous polyurethane is less apt to be yielded.

PRIOR-ART DOCUMENTS

Patent Documents

Patent Document 1: JP-A-10-259577
Patent Document 2: JP-A-2004-250683
Patent Document 3: JP-A-2004-332126

SUMMARY OF THE INVENTION

Problems that the Invention is to Solve

An object of the invention, in view of the current circumstances described above, is to provide: a polyester polyol to be used as a raw material for a polyurethane which has high peeling property and excellent homogeneity and is exceedingly useful in applications such as elastic fibers, films, and clothing; a polyurethane obtained using the polyester polyol; and a process for producing the polyurethane.

Another object is to provide a molded polyurethane object (hereinafter referred to also as molded polyurethane) which is extremely useful in applications such as elastic fibers having excellent homogeneity and high peeling property, films, and clothing and in which the relative proportion of silicon atoms to carbon atoms in the surface thereof is in a specific range.

Means for Solving the Problems

The present inventors diligently made investigations in order to overcome the problems. As a result, the inventors have found that when a polyester polyol which has ester bonds formed from a polycarboxylic acid having a polysiloxane framework and a plurality of carboxyl groups or a polycarboxylic acid ester having a polysiloxane framework and a plurality of ester groups and from a polyether polyol is used for polyurethane production, then the polyurethane obtained has transparency to a certain degree or higher and simultaneously shows high peeling property. The invention has been thus completed.

The inventors have further found that a molded polyurethane obtained using a polysiloxane polyol having a specific molecular structure shows high peeling property when the relative proportion of silicon atoms to carbon atoms in the surface of the molded polyurethane, Si/C, has been regulated so as to be in a specific range. The invention has been thus completed.

Essential points of the invention are as follows.
1. A process for producing a polyurethane, which comprises using a polyester polyol (a-1), a polyether polyol (b), an isocyanate compound (c) and a chain extender (d) as a raw material to produce a polyurethane, wherein the polyester polyol (a-1) is a polyester polyol (a-1) obtained by forming an ester bond between either a carboxyl group of a polycarboxylic acid (i-1) having a polysiloxane framework and a plurality of carboxyl groups or an ester group of a polycarboxylic acid ester (i-2) having a polysiloxane framework and a plurality of ester groups, and a hydroxyl group of a polyether polyol (ii).
2. The process for producing a polyurethane according to the item 1 above, which comprises obtaining a mixture of the polyester polyol (a-1) and the polyether polyol (b).
3. The process for producing a polyurethane according to the item 1 or 2 above, which comprises reacting the mixture obtained by the step of obtaining a mixture of the polyester polyol (a-1) and the polyether polyol (b) with the isocyanate compound (c) to obtain a prepolymer having an isocyanate group at both ends thereof.
4. The process for producing a polyurethane according to any one of the items 1 to 3 above, wherein the polyester polyol (a-1) has an ester bond formed between two terminal carboxyl groups in one molecule of the polycarboxylic acid (i-1) having a polysiloxane framework and a plurality of carboxyl groups and terminal hydroxyl groups in two molecules of the polyether polyol (ii).
5. The process for producing a polyurethane according to any one of the items 1 to 4 above, wherein the polyester polyol (a-1) is obtained using polytetramethylene ether glycol as the polyether polyol (ii).
6. The process for producing a polyurethane according to any one of the items 1 to 5 above, wherein the polyester polyol (a-1) has a number-average molecular weight of 1,000-4,000.
7. The process for producing a polyurethane according to any one of the items 1 to 6 above, wherein the polyester polyol (a-1) is used in an amount of 0.1-10% by weight based on the total amount of the polyester polyol (a) and the polyether polyol (b) to be used.
8. The process for producing a polyurethane according to any one of the items 1 to 7 above, wherein the isocyanate compound (c) is an aromatic polyisocyanate.
9. The process for producing a polyurethane according to any one of the items 1 to 8 above, wherein the chain extender (d) is a polyamine compound.
10. A polyurethane obtained by the process for producing a polyurethane according to any one of the items 1 to 9 above.
11. A polyurethane film comprising the polyurethane according to the item 10 above.
12. A polyurethane fiber comprising the polyurethane according to the item 10 above.
13. A polyester polyol obtained by forming an ester bond between either a carboxyl group of a polycarboxylic acid (i-1) having a polysiloxane framework and a plurality of carboxyl groups or an ester group of a polycarboxylic acid ester (i-2) having a polysiloxane framework and a plurality of ester groups, and a hydroxyl group of a polyether polyol (ii).
14. A polyol mixture which comprises the polyester polyol according to the item 13 above and a polyether polyol.
15. A molded object of a polyurethane obtained from a polysiloxane polyol (a-2) represented by the following structural formula (I), a polyether polyol (b), an isocyanate compound (c) and a chain extender (d), wherein the relative proportion of silicon atoms to carbon atoms in the surface of the molded object, Si/C, is 0.03-0.5.

[Chem. 1]

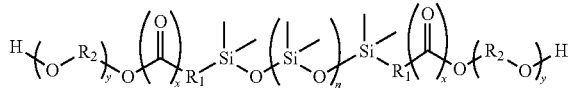

(1)

(In formula (1), the two $R_1$ each independently are an alkylene group having 1-15 carbon atoms, the two $R_2$ each independently are an alkylene group having 2-6 carbon atoms, x is an integer of 0 or 1, the two y's each independently are an integer of 5-50, and n is an integer of 1-100.)
16. The molded object according to the item 15 above, wherein the polyether polyol (b) is polytetramethylene ether glycol.
17. The molded object according to the item 15 or 16 above, wherein the polysiloxane polyol (a-2) has a number-average molecular weight of 500-5,000.
18. The molded object according to any one of the items 15 to 17 above, wherein the polyisocyanate compound (c) is an aromatic polyisocyanate.
19. The molded object according to any one of the items 15 to 18 above, wherein the chain extender (d) is a polyamine compound.
20. The molded object according to any one of the items 15 to 19 above, which is a polyurethane film.
21. The molded object according to any one of the items 15 to 20 above, which is a polyurethane fiber.
22. The molded object according to any one of the items 15 to 21 above, wherein the polyurethane is a polyurethane obtained by mixing the polysiloxane polyol (a-2) with the polyether polyol (b) to obtain a polyol mixture and then reacting the mixture with the polyisocyanate compound (c) and the chain extender (d).
23. The molded object according to any one of the items 15 to 22 above, wherein the polyurethane is a polyurethane obtained using a polyol mixture prepared by introducing and then mixing or dispersing the polysiloxane polyol (a-2) and the polyether polyol (b) through separate lines.

Effects of the Invention

According to the invention, it is possible to provide a polysiloxane polyol to be used as a raw material for a polyurethane which has high peeling property and excellent homogeneity and is exceedingly useful in applications such as elastic fibers, films, and clothing, and to provide a polyurethane obtained using the polysiloxane polyol and a process for producing the polyurethane. Furthermore, it is possible to provide a molded polyurethane which has high peeling property and is exceedingly useful in applications such as elastic fibers, films, and clothing.

MODES FOR CARRYING OUT THE INVENTION

Representative embodiments for practicing the invention are described below. However, the following are embodiments (representative embodiments) of the invention, and the invention should not be construed as being limited to the following embodiments unless the invention departs from the spirit thereof.
<1. Production of Polyurethane>
<1-1. Raw Materials for Producing Polyurethane>
The polyurethane of the invention is obtained using the following raw materials: a polyester polyol (a-1) [hereinafter often referred to as polysiloxane polyol (a-1)] obtained from either a polycarboxylic acid (i-1) having a polysiloxane framework and a plurality of carboxyl groups or a polycarboxylic acid ester (i-2) having a polysiloxane framework and a plurality of ester groups and from a polyether polyol (ii), or a polysiloxane polyol (a-2) having a specific structure [hereinafter, (a-1) and (a-2) are often inclusively referred to as polysiloxane polyol (a)]; a polyether polyol (b); a polyisocyanate compound (c); and a chain extender (d).

In the invention, the term "polyurethane" means both a polyurethane and a polyurethane-urea, which have conventionally been known to show similar properties, unless otherwise indicated.

A difference in structural feature between the polyurethane and the polyurethane-urea is that the polyurethane is a polymer in which the chain structure has been formed mainly by urethane bonds while the polyurethane-urea is a polymer in which the chain structure has been formed mainly by urethane bonds and urea bonds. A difference therebetween in raw materials is that the polyurethane is produced using a short-chain polyol as a chain extender while the polyurethane-urea is produced using a polyamine compound as a chain extender.

The proportions of the raw materials are usually as follows. When the total number of moles of the hydroxyl groups of the polysiloxane polyol (a) and polyether polyol (b) is expressed by A, the number of moles of the isocyanate groups of the isocyanate compound (c) is expressed by B, and the number of moles of the active-hydrogen substituents (hydroxyl groups and/or amino groups) of the chain extender (d) is expressed by C, then A:B is usually preferably in the range of 1:10 to 1:1, more preferably in the range of 1:5 to 1:1.05, even more preferably in the range of 1:3 to 1:1.1, especially preferably in the range of 1:2.5 to 1:1.2, most preferably in the range of 1:2 to 1:1.2, and (B-A):C is usually preferably in the range of 1:0.1 to 1:5, more preferably in the range of 1:0.8 to 1:2, even more preferably in the range of 1:0.9 to 1:1.5, especially preferably in the range of 1:0.95 to 1:1.2, most preferably in the range of 1:0.98 to 1:1.1.

<1-1-1. Polysiloxane Polyol (a)>

The polysiloxane polyol (a) to be used in the invention is a compound which has a plurality of siloxane moieties and a plurality of hydroxyl groups. The polysiloxane polyol (a) to be used can be a known polysiloxane polyol. Examples thereof include a polysiloxane polyol in which hydroxyl groups have been introduced into side chains of the polysiloxane framework, a polysiloxane polyol in which hydroxyl groups have been introduced into both ends of the polysiloxane framework, a polysiloxane polyol in which hydroxyl groups have been introduced into one end only of the polysiloxane framework, and a polysiloxane polyol in which hydroxyl groups have been introduced into one end and a side chain of the polysiloxane framework. Of these, the polysiloxane polyol in which hydroxyl groups have been introduced into both ends of the polysiloxane framework is preferred from the standpoint of obtaining a polyurethane which is a block copolymer.

The proportion of the polysiloxane moiety in the polysiloxane polyol (a) to be used in the invention is not particularly limited. However, the lower limit thereof is usually preferably 5% by weight or more, more preferably 10% by weight or more, even more preferably 15% by weight or more, especially preferably 20% by weight or more, most preferably 25% by weight or more. The larger the value of the proportion, the more the peeling property of the polyurethane to be obtained tends to improve.

On the other hand, the upper limit thereof is usually preferably 90% by weight or less, more preferably 80% by weight or less, even more preferably 70% by weight or less, especially preferably 60% by weight or less, most preferably 55% by weight or less. The smaller the value of the proportion, the more the compatibility with the polyether polyol improves and the more the transparency and homogeneity of the polyurethane to be obtained tends to increase. Incidentally, the proportion of the polysiloxane moiety in the polysiloxane polyol (a) can be easily calculated, for example, through an examination by NMR.

The number-average molecular weight of the polysiloxane polyol (a) is not particularly limited. However, the lower limit thereof is usually preferably 500 or higher, more preferably 700 or higher, even more preferably 1,000 or higher. The upper limit thereof is usually preferably 5,000 or lower, more preferably 4,500 or lower, even more preferably 4,000 or lower.

By regulating the number-average molecular weight thereof so as to be not higher than the upper limit, the polysiloxane polyol (a) is made to have better compatibility with the polyether polyol (b) and solvent to be used for polyurethane production, making it easy to produce a homogeneous polyurethane. Furthermore, there is a tendency that when a mixture of this polysiloxane polyol (a) and a polyether polyol (b) (hereinafter often referred to as polyol mixture), a prepolymer, or a prepolymer solution is formed, the mixture, prepolymer, and solution are inhibited from having too high a viscosity, resulting in improvements in handleability and productivity. By regulating the number-average molecular weight thereof so as to be not lower than the lower limit, sufficient peeling property can be imparted to the polyurethane polymer to be obtained.

The properties of the polysiloxane polyol (a) to be used in the invention are not particularly limited. However, the polysiloxane polyol (a) may be liquid or waxy at ordinary temperature. The properties and state of the polysiloxane polyol (a) may be variously selected according to applications.

The polyester polyol (a-1), as one form of the polysiloxane polyol (a) to be used in the invention, is explained below. The polyester polyol (a-1) is obtained from a polycarboxylic acid (i-1) having a polysiloxane framework and a plurality of carboxyl groups or a polycarboxylic acid ester (i-2) having a polysiloxane framework and a plurality of ester groups [hereinafter, the acid (i-1) and the ester (i-2) are often referred to as "polycarboxylic acid or polycarboxylic acid ester (i) having a polysiloxane framework"] and from a polyether polyol (ii) by esterifying carboxyl groups of the polycarboxylic acid (i-1) with hydroxyl groups of the polyether polyol (ii) or by causing ester groups of the polycarboxylic acid ester (i-2) to undergo a transesterification reaction with hydroxyl groups of the polyether polyol (ii).

<1-1-1-1. Polyester Polyol (a-1)>

The polyester polyol (a-1) to be used in the invention usually is a polyester polyol which has two or more ester bonds and two or more hydroxyl groups in the molecule. This polyester polyol (a-1) usually is a polyester polyol which has two or more ester bonds in total per molecule that were formed by the reaction of two or more carboxyl or ester groups possessed by one molecule of a polycarboxylic acid or polycarboxylic acid ester (i) having a polysiloxane framework respectively with hydroxyl groups of at least two molecules of a polyether polyol (ii) and which further has two or more hydroxyl groups in total per molecule that are the sum of the one or more hydroxyl groups remaining unreacted with a carboxyl group among the two or more hydroxyl groups of each of the at least two bonded molecules of the polyether polyol (ii).

Namely, when this polyester polyol is expressed in terms of the mode of bonding between a moiety (expressed by [X]) derived from the polycarboxylic acid or polycarboxylic acid ester (i) having a polysiloxane framework and a moiety (expressed by [Y]) derived from the polyether polyol (ii), then the polyester polyol is a polyester polyol of the $(YX)_i$—Y type in which [X] and [Y] have been bonded to each other through an ester bond (symbol i represents any integer of 1 or larger).

Methods for producing the polyester polyol (a-1) to be used in the invention are not particularly limited so long as the polyester polyol (a-1) has the molecular structure described above. Besides the production process described above, there is, for example, a process for producing a polyester polyol that is configured of a polysiloxane framework having an ester bond and a polyether chain which have been bonded to each of both ends of the framework through a linking moiety such as, for example, an alkylene group, the process including hydrosilylation in which an end-unsaturated ester compound is reacted with an organopolysiloxane having at least one silicon-bonded hydrogen atom.

However, a preferred process for polyester polyol production is the former process, in which the desired polyester polyol is obtained by the dehydrating or dealcoholization reaction of a polycarboxylic acid or polycarboxylic acid ester with a polyether polyol. This is because when the same polyether polyol as the polyether polyol to be used for polyurethane production is introduced into the molecule in an amount not smaller than a given value, then a polyurethane having higher transparency can be produced.

Especially preferred embodiments are polyester polyols of the YXY type, i.e., the mode of bonding in which i=1, in which two carboxyl or ester groups possessed by one molecule of a polycarboxylic acid or polycarboxylic acid ester (i) having a polysiloxane framework have formed ester bonds respectively with two hydroxyl groups respectively possessed by two molecules of a polyether polyol (ii).

A particularly preferred embodiment among these is a polyester polyol in which two terminal carboxyl or ester groups possessed by one molecule of a polycarboxylic acid or polycarboxylic acid ester (i) having a polysiloxane framework have formed ester bonds respectively with two terminal hydroxyl groups respectively possessed by two molecules of a polyether polyol (ii).

The polyester polyol (a-1) to be used in the invention may have structures other than the above-described moieties in the molecule. It is, however, preferred that the polyester polyol (a-1) should be a polyester polyol which contains no structure other than the moieties described above.

In general, addition of a silicone compound during polyurethane production is effective in improving the peeling property of the polyurethane to be obtained. However, there has been a problem that silicone compounds show poor compatibility with the polyether polyol used as another main raw material and with a solvent, resulting in an cloudy polyurethane or making it difficult to produce a homogeneous film or fiber.

In contrast, in the invention, use of the polyester polyol (a-1) obtained by introducing a polyether polyol (ii) into a polycarboxylic acid or polycarboxylic acid ester (i) having a polysiloxane framework brings about the following effect. When a mixture of this polyester polyol (a-1) and the polyether polyol (b) which will be described later is produced in the polyurethane production which will be described later, the two polyols show improved compatibility to make it easy to produce a homogeneous and transparent film or fiber, although the resultant polyurethane decreases in peeling property as the proportion of the polysiloxane moiety in the polyester polyol (a-1) decreases.

<1-1-1-1-1. Raw Materials for Producing Polyester Polyol (a-1)>

Production of a polyester polyol (a-1) from a polycarboxylic acid or polycarboxylic acid ester (i) having a polysiloxane framework and a polyether polyol (ii) by causing carboxyl or ester groups of the former (i) and hydroxyl groups of the latter (ii) to form ester bonds is described below in detail as a preferred process among the processes described above as examples in which a polysiloxane having carboxyl or ester groups at the molecular ends is reacted with a diol to form ester bonds.

<1-1-1-1-1-a. Polycarboxylic Acid or Polycarboxylic Acid Ester (i) Having Polysiloxane Framework>

The polycarboxylic acid or polycarboxylic acid ester (i) having a polysiloxane framework which is to be used in the invention is a compound having a plurality of siloxane moieties and a plurality of carboxyl or ester groups.

The polysiloxane framework is not particularly limited so long as the polysiloxane framework has a siloxane framework. Examples thereof include polyalkylsiloxanes such as polydimethylsiloxane and polydiethylsiloxane, polyalkylarylsiloxanes such as polymethylphenylsiloxane, and polyarylsiloxanes such as polydiphenylsiloxane. Especially preferred of these is polydimethylsiloxane.

Although the polycarboxylic acid or polycarboxylic acid ester (i) having a polysiloxane framework may have a plurality of carboxyl groups or ester groups, it is preferred that the acid or ester (i) should have two carboxyl or ester groups.

The positions of the carboxyl or ester groups in the polycarboxylic acid or polycarboxylic acid ester having a polysiloxane framework are not particularly limited. Examples thereof include an acid or ester which has carboxyl or ester groups in side chains of the molecule, an acid or ester which has carboxyl or ester groups at both molecular ends, an acid or ester which has carboxyl or ester groups at one end of the molecule and in a side chain thereof, and an acid or ester which has carboxyl or ester groups at one molecular end only.

Especially preferred of these, from the standpoint of obtaining a polyurethane having high properties, is a dicarboxylic acid or dicarboxylic acid ester which has carboxyl or ester groups at both ends of the polysiloxane.

Several polycarboxylic acids (i-1) having a polysiloxane framework are on the market, and these known polycarboxylic acids can be used in the invention. No polycarboxylic acid ester (i-2) having a polysiloxane framework is on the market. However, a polycarboxylic acid ester (i-2) having a polysiloxane framework can be produced through the transesterification reaction of a polycarboxylic acid (i-1) having a polysiloxane framework with an alcohol by a known method.

Incidentally, the polycarboxylic acid or polycarboxylic acid ester (i) having a polysiloxane framework usually is one in which each carboxyl or ester group has been bonded to a silicon atom through a linking group.

The linking group is not particularly limited. Examples thereof include alkylene groups such as methylene, dimethylene, trimethylene, tetramethylene, pentamethylene, hexamethylene, heptamethylene, octamethylene, nonamethylene, decamethylene, undecamethylene, dodecamethylene, tridecamethylene, tetradecamethylene, and pentadecamethylene, alkenylene groups such as vinylene and propenylene, and arylene groups such as phenylene. Preferred of these are alkylene groups. Especially preferred are the linear alkylene groups having 4-12 carbon atoms.

The molecular weight of the polycarboxylic acid or polycarboxylic acid ester (i) having a polysiloxane framework which is to be used in the invention is preferably 300 or higher, more preferably 500 or higher, even more preferably 1,000 or higher, in terms of number-average molecular weight. The molecular weight thereof is preferably 5,000 or lower, more preferably 4,000 or lower, even more preferably 3,000 or lower.

By regulating the number-average molecular weight thereof so as to be not higher than the upper limit, the resultant polyester polyol (a-1) is prevented from having too high a polysiloxane moiety content and hence from showing impaired compatibility with the polyether polyol (b) and solvent to be used for polyurethane production. As a result, it becomes easy to produce a homogeneous polyurethane. Furthermore, the polycarboxylic acid or polycarboxylic acid ester (i) is thus prevented from having too high a molecular weight. Consequently, when a mixture of the polyester polyol (a-1) and the polyether polyol (b) (hereinafter often referred to as polyol mixture) or a prepolymer or prepolymer solution is formed, the mixture, prepolymer, or solution is inhibited from having too high a viscosity. Improvements in handleability and productivity can hence be attained.

On the other hand, by regulating the number-average molecular weight thereof so as to be not lower than the lower limit, the resultant polyester polyol (a-1) can be made to have an increased polysiloxane moiety content and sufficient peeling property can be imparted to the polyurethane polymer to be obtained.

The properties of the polycarboxylic acid or polycarboxylic acid ester (i) having a polysiloxane framework which is to be used in the invention are not particularly limited, and the acid or ester (i) to be used can be liquid or waxy at ordinary temperature. The acid or ester (i) which is liquid is preferred because of the satisfactory handleability thereof.

<1-1-1-1-1-b. Polyether Polyol (ii)>

The polyether polyol (ii) to be used in the invention usually is a hydroxy compound which has one or more ether bonds in the main framework of the molecule. The repeating units in the main framework may be units of either a saturated hydrocarbon or an unsaturated hydrocarbon, and may be either linear, or branched, or cyclic.

Examples of the repeating units in the main framework include a 1,2-ethylene glycol unit, 1,2-propylene glycol unit, 1,3-propanediol (trimethylene glycol) unit, 2-methyl-1,3-propanediol unit, 2,2-dimethyl-1,3-propanediol unit, 1,4-butanediol (tetramethylene glycol) unit, 2-methyl-1,4-butanediol unit, 3-methyl-1,4-butanediol unit, 3-methyl-1,5-pentanediol unit, neopentyl glycol unit, 1,6-hexanediol unit, 1,7-heptanediol unit, 1,8-octanediol unit, 1,9-nonanediol unit, 1,10-decanediol unit, and 1,4-cyclohexanedimethanol unit.

Preferred examples of the polyether polyol (ii), among the polyether polyols having those repeating units in the main frameworks thereof, are polytetramethylene ether glycol, polytrimethylene ether glycol, copolyether polyols obtained by reacting 1-20% by mole 3-methyltetrahydrofuran with tetrahydrofuran (e.g., "PTG-L1000", "PTG-L2000", and "PTG-L3500", all manufactured by Hodogaya Chemical Co., Ltd.), and copolyether glycols obtained by reacting neopentyl glycol with tetrahydrofuran.

These polyether polyols can be used alone or as a mixture of two or more thereof, and one or more thereof may be variously selected according to the desired properties of the polyurethane. For obtaining a homogeneous polyurethane, it is preferred to use the same polyether polyol as the polyether polyol (b) to be used for polyurethane production.

The molecular weight of the polyether polyol (ii) to be used in the invention, in terms of number-average molecular weight, is preferably 200 or higher, more preferably 300 or higher, even more preferably 500 or higher, and is preferably 3,000 or lower, more preferably 2,500 or lower, even more preferably 2,000 or lower.

By regulating the number-average molecular weight thereof so as to be not higher than the upper limit, the resultant polyester polyol (a) is prevented from having an exceedingly high molecular weight and too high a viscosity, and handleability during polyurethane production and productivity can be improved. Furthermore, the polyester polyol is prevented from having too high a polyether moiety content, and sufficient peeling property can be imparted to the polyurethane.

On the other hand, by regulating the number-average molecular weight thereof so as to be not lower than the lower limit, the resultant polyester polyol is made to have a sufficient polyether moiety content and satisfactory compatibility with the polyether polyol (b), making it possible to yield a homogeneous polyurethane.

Incidentally, number-average molecular weight can be determined by the method for hydroxyl value (KOH(mg)/g) measurement based on acetylation in accordance with JIS K1557-1:2007.

<1-1-1-1-2. Production of Polyester Polyol (a-1)>
<1-1-1-1-2-a. Catalyst>

The polyester polyol (a-1) in the invention preferably is a polyester polyol obtained by the esterification or transesterification reaction of the polycarboxylic acid or polycarboxylic acid ester (i) having a polysiloxane framework with the polyether polyol (ii).

The esterification or transesterification reaction can be conducted in a system in which no catalyst is present. Usually, however, an inorganic acid or an organic acid can be used in order to cause these reactions to proceed smoothly.

As the inorganic acid or organic acid, use can be made of any catalyst for use in ordinary esterification reactions and transesterification reactions. Preferred are: chlorides, oxides, and hydroxides of metals such as Li, Na, K, Rb, Ca, Mg, Sr, Zn, Al, Ti, V, Cr, Mn, Fe, Co, Ni, Cu, Sn, Sb, and Pb, and salts of these metals with fatty acids such as acetic acid, oxalic acid, octylic acid, lauric acid, and naphthenic acid; alcohol compounds such as sodium methoxide, sodium ethoxide, aluminum triisopropoxide, isopropyl titanate, and n-butyl titanate; phenol compounds such as sodium phenolate; and other organometallic compounds of metals such as Al, Ti, Zn, Sn, Zr, and Pb.

Most preferred of these are titanium-based catalysts such as isopropyl titanate and n-butyl titanate, because these catalysts are easily available and lowly toxic and are in wide use in esterification or transesterification reactions.

The amount of the catalyst to be used, based on the total amount of all raw materials for preparing the polyester polyol (a-1), is preferably 0.00001% by weight or more, more preferably 0.0001% by weight or more, most preferably 0.001% by weight or more, and is preferably 1.0% by weight or less, more preferably 0.1% by weight or less, most preferably 0.02% by weight or less.

By regulating the use amount of the catalyst so as to be not less than the lower limit, the period required for polyester polyol formation can be shortened and the reaction product can be prevented from taking a color. By regulating the amount thereof so as to be not higher than the upper limit, the catalyst can be prevented from excessively accelerating the polyurethane formation reaction.

<1-1-1-1-2-b. Esterification or Transesterification Reaction>

For producing the polyester polyol (a-1) to be used in the invention, a conventionally known technique for esterification or transesterification can usually be employed. Examples thereof include a method in which the polycarboxylic acid or polycarboxylic acid ester (i) having a polysiloxane framework is reacted with the polyether polyol (ii) at ordinary pressure, a method in which these reactants are reacted at a reduced pressure, and a method in which the reactants are reacted in the presence of an inert solvent, such as toluene, and the water or alcohol formed by condensation is thereafter removed from the reaction system by azeotropy with the solvent.

The reaction temperature for the esterification or transesterification reaction is usually preferably 100° C. or higher, more preferably 120° C. or higher, even more preferably 140° C. or higher, especially preferably 150° C. or higher. The reaction temperature is usually preferably 250° C. or lower, more preferably 240° C. or lower, even more preferably 230° C. or lower, especially preferably 220° C. or lower.

By regulating the reaction temperature so as to be not lower than the lower limit, the esterification or transesterification reaction can be caused to proceed sufficiently. By regulating the reaction temperature so as to be not higher than the upper limit, the reaction product can be prevented from taking a color.

It is preferred that the esterification or transesterification reaction should be conducted in an inert gas atmosphere such as nitrogen or argon. Any desired reaction pressure may be used, and the reaction can be conducted at ordinary pressure or a reduced pressure according to purposes. An inert gas may be passed through the reaction system in order that the water or alcohol which generates during the reaction be removed from the reaction system.

The reaction time of the esterification reaction is usually preferably 0.5 hours or longer, more preferably 1 hour or longer, although the reaction time varies depending on the amount of the catalyst used, reaction temperature, the substrate to be reacted, the desired properties of the polyester polyol to be yielded, etc. The reaction time is usually preferably 30 hours or less, more preferably 20 hours or less.

<1-1-1-1-2-c. Post-Treatment>

Removal of the titanium-based catalyst and other substances from the polyester polyol yielded as a reaction product usually involves complicated steps. In general, the polyester polyol yielded is frequently used as such for polyurethane production without separating the titanium catalyst therefrom. It is, however, preferred to deactivate beforehand the titanium catalyst present in the polyester polyol, in the case where the catalyst is contained in a large amount or according to applications of the polyurethane.

Examples of methods for deactivating the titanium catalyst contained in the polyester polyol include a method in which the polyester polyol is brought into contact with water with heating and a method in which the polyester polyol is treated with a phosphorus compound such as phosphoric acid, a phosphoric ester, phosphorous acid, a phosphorous ester, etc.

In the former method, in which the polyester polyol is brought into contact with water, catalyst deactivation may be accomplished by adding at least 1% by weight water to the polyester polyol and heating the mixture at a temperature of preferably 70-150° C., more preferably 90-130° C., for about 1-3 hours. This deactivation treatment with heating may be conducted at ordinary pressure or at an elevated pressure. By reducing the pressure of the system after the deactivation treatment, the water used for the deactivation can be smoothly removed from the polyester polyol.

<1-1-1-1-3. Properties of Polyester Polyol (a-1)>

The molecular weight and polysiloxane framework content of the polyester polyol (a-1) to be yielded can be easily changed according to the desired properties of the polyurethane resin, by regulating the conversions into polymer of the polycarboxylic acid or polycarboxylic acid ester (i) having a polysiloxane framework and of the polyether polyol (ii).

Use may be made of a method in which the polyether polyol (ii) is added in such an amount that two or more molecules thereof are added per molecule of the polycarboxylic acid or polycarboxylic acid ester (i) having a polysiloxane framework to conduct esterification or transesterification and the resultant mixture of a polyester polyol (a-1) and the unreacted polyether polyol (ii) is used as a raw material for a urethane formation reaction.

<1-1-1-2. Polysiloxane Polyol (a-2)>

Examples of the polysiloxane polyol (a) to be used in the invention include a polysiloxane polyol (a-2) that has a molecular structure represented by the following structural formula (1) and that gives a molded polyurethane in which the relative proportion of silicon atoms to carbon atoms in the surface thereof, Si/C (hereinafter often abbreviated to "relative proportion"), is 0.03-0.5.

The polysiloxane polyol (a-2) to be used may be one obtained by a known production process, or a commercial polysiloxane polyol as such can be used.

The polysiloxane polyol (a-2) to be used in the invention is an ether-modified silicone which has in the molecule thereof a polyether moiety that contributes to an improvement in the transparency and homogeneity of the polyurethane and a polysiloxane moiety that contributes to an improvement in the peeling property of the polyurethane. Ether-modified silicones which differ in the length of the polysiloxane moiety (n in the following structural formula (1)) or of the polyether moiety (y in the following structural formula (1)) may be used according to the desired properties of the polyurethane.

[Chem. 2]

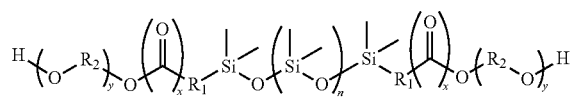

(1)

In structural formula (1), the two $R_1$ moieties each independently are an alkylene group having 1-15 carbon atoms, the two $R_2$ moieties each independently are an alkylene group having 2-6 carbon atoms, x is an integer of 0 or 1, the two y's each independently are an integer of 5-50, and n is an integer of 1-100.

Symbol x in the structural formula (1) is an integer of 0 or 1, and the value thereof is determined by the process used for producing the polysiloxane polyol (a-2).

Symbol y in structural formula (1) is 5-50, and the lower limit thereof is generally 5 or larger, preferably 7 or larger, more preferably 10 or larger. The upper limit thereof is generally 50 or less, preferably 40 or less, more preferably 30 or less.

In the case where the value of n is constant, the larger the value of y, the higher the compatibility with the polyether polyol (b) and the easier the production of a homogeneous polyurethane. However, in case where the value of y exceeds the upper limit, this polysiloxane polyol has too high a molecular weight and hence too high a viscosity, resulting in impaired handleability and productivity during polyurethane production.

On the other hand, in the case where the value of n is constant, the smaller the value of y, the higher the polysiloxane framework content in the polysiloxane polyol (a-2) and, hence, the higher the peeling property of the polyurethane polymer to be obtained.

The number of carbon atoms of $R_2$ in structural formula (1) is 2-6, and is preferably 2-4 from the standpoints of influences on the properties of the polyurethane and of suitability for general-purpose use. The polyoxyalkylene moiety ((—$R_2$—O—)$_y$ group in structural formula (1)) may be constituted of oxyalkylene groups of one kind, or may be constituted of a plurality of oxyalkylene groups differing in the number of carbon atoms of $R_2$.

In structural formula (1), the number of repetitions n of the dimethylsiloxane framework is an integer of 1-100, usually preferably 2 or larger, more preferably 3 or larger, even more preferably 5 or larger. The value of n is usually preferably 70 or less, more preferably 50 or less, even more preferably 30 or less.

In the case where the value of y is constant, the larger the value of n, the more the peeling property of the polyurethane polymer to be obtained tends to be improved. On the other hand, the smaller the value of n, the higher the compatibility with the polyether polyol and the more the production of a homogeneous polyurethane tends to become easy.

In general, addition of a silicone compound during polyurethane production is effective in improving the peeling property of the polyurethane. However, silicone compounds show poor compatibility with the polyether polyol (b) used as another main raw material and with a solvent. There has hence been a problem that an cloudy polyurethane is yielded or it difficult to produce a homogeneous film or fiber.

In contrast, when a polysiloxane polyol (a-2) represented by structural formula (1) which has polyether moieties each constituted of five or more oxyalkylene groups, i.e., the number of repeating units y is 5 or larger, is used, then this polysiloxane polyol (a-2) and a polyether polyol (b) show improved compatibility with each other when a mixture of these is prepared during polyurethane production, thereby making it easy to produce a homogeneous and transparent film or fiber.

When the polysiloxane polyol (a-2) is represented by structural formula (1) wherein x is 0, that is, the alkylene groups (—$R_1$— groups) bonded to the polysiloxane moiety have been linked to the plurality of oxyalkylene groups (—$R_2$—O— groups) by means of an ether bond, then this polysiloxane polyol (a-2) to be used can be either a commercial polysiloxane polyol or a polysiloxane polyol obtained by a known process (for example, the process described in JP-B-5-29706).

When the polysiloxane polyol (a-2) is represented by structural formula (1) wherein x is 1, that is, the alkylene groups (—$R_1$— groups) bonded to the polysiloxane framework have been linked to the plurality of oxyalkylene groups (—$R_2$—O— groups) by means of an ester bond, then this polysiloxane polyol (a-2) to be used can be produced not only by the known process in which an end-unsaturated ester is reacted with an organo(poly)siloxane having at least one silicon-bonded hydrogen atom (JP-A-9-278891) but also by the esterification or transesterification reaction of a polycarboxylic acid or polycarboxylic acid ester (i) having a polysiloxane framework with a polyether polyol (ii) as described above.

The polysiloxane polyol yielded by the esterification or transesterification reaction of a polycarboxylic acid or polycarboxylic acid ester (i) having a polysiloxane framework with a polyether polyol (ii) is expected to contain a polyester type polyol yielded in a small amount besides the polysiloxane polyol (a-2) represented by structural formula (1), the polyester type polyol having a plurality of alternating structures configured of a polysiloxane unit and a polyether unit. However, even when a polysiloxane polyol having such a structure has been yielded in a small amount, the possibility of posing a problem in the preparation of a polyol mixture or in polyurethane formation is low and use of this polysiloxane polyol (a-2) is within the scope of the invention.

<1-1-1-3. Polysiloxane Polyol (a-3)>

In another embodiment of the invention, a polysiloxane polyol (a-3) represented by structural formula (1) wherein the value of y is 4 or less can be used as the polysiloxane polyol (a).

The polysiloxane polyol (a-3) has high hydrophobicity because the polyether chains are short, and show poorer compatibility with polyether polyols and solvents than polysiloxane polyols in which the polyether chains are long. However, by adding the polysiloxane polyol (a-3) during polyurethane production, improved peeling property can be imparted to the polyurethane.

Examples of the polysiloxane polyol (a-3) include ones which are on the market as carbinol-modified silicones. Examples thereof include the carbinol-modified silicone (KF-6001, manufactured by Shin-Etsu Chemical Co., Ltd.; number-average molecular weight, 1,820) used as polysiloxane polyol 6 in Reference Example 3.

The structure of the carbinol-modified silicone is represented by structural formula (1) wherein n=2, x=0, y=1, $R_1$ is the alkylene group having 3 carbon atoms, and $R_2$ is the alkylene group having 2 carbon atoms. Namely, the value of y is not 5 or larger. The carbinol-modified silicone is a polysiloxane polyol of a structure which does not satisfy structural formula (1).

<1-1-1-4. Polysiloxane Polyol (a-4)>

In still another embodiment of the invention, examples of the polysiloxane polyol (a) include a polysiloxane polyol (a-4) which has in the molecule thereof a polylactone bonded through an ester bond.

The polysiloxane polyol (a-4) which has a polylactone in the molecule thereof can be produced by addition-polymerizing a lactone with a polysiloxane polyol (a-3) by a known method and thereby reacting the lactone with a hydroxyl group of the polysiloxane polyol (a-3) to form an ester bond. By changing the amount of the lactone to be used relative to the amount of the polysiloxane polyol (a-3), the content ratio of polysiloxane units to polylactone units can be easily changed.

Examples of the lactone include ε-caprolactone, 4-methylcaprolactone, 3,5,5-trimethylcaprolactone, 3,3,5-trimethylcaprolactone, β-propiolactone, γ-butyrolactone, δ-valerolactone, γ-valerolactone, and enantholactone. These lactones can be used alone or as a mixture of two or more thereof. ε-Caprolactone is most preferred because this lactone is easily available and has high reactivity.

<1-1-2. Polyether Polyol (b)>

The polyether polyol (b) to be used in the invention usually is a hydroxy compound which has one or more ether bonds in the main framework of the molecule. The repeating units in the main framework may be units of either a saturated hydrocarbon or an unsaturated hydrocarbon, and may be either linear, or branched, or cyclic.

Examples of the repeating units include a 1,2-ethylene glycol unit, 1,2-propylene glycol unit, 1,3-propanediol (trimethylene glycol) unit, 2-methyl-1,3-propanediol unit, 2,2-dimethyl-1,3-propanediol unit, 1,4-butanediol (tetramethylene glycol) unit, 2-methyl-1,4-butanediol unit, 3-methyl-1,4-butanediol unit, 3-methyl-1,5-pentanediol unit, neopentyl glycol unit, 1,6-hexanediol unit, 1,7-heptanediol unit, 1,8-octanediol unit, 1,9-nonanediol unit, 1,10-decanediol unit, and 1,4-cyclohexanedimethanol unit.

Preferred of the polyether polyols having those repeating units in the main frameworks thereof are polytetramethylene ether glycol, polytrimethylene ether glycol, copolyether polyols obtained by reacting 1-20% by mole 3-methyltetrahydrofuran with tetrahydrofuran (e.g., "PTG-L1000", "PTG-L2000", and "PTG-L3500", all manufactured by Hodogaya Chemical Co., Ltd.), copolyether glycols obtained by reacting neopentyl glycol with tetrahydrofuran, and the like.

These polyether polyols can be used alone or as a mixture of two or more thereof, and one or more thereof may be variously selected according to the desired properties of the polyurethane.

In the case where the polyester polyol (a-1) described above is used as the polysiloxane polyol (a), it is preferred, for obtaining a homogeneous polyurethane, to use a polyether polyol (b) which is the same as the polyether polyol (ii) used for producing the polyester polyol (a-1).

The molecular weight of the polyether polyol (b) to be used in the invention, in terms of number-average molecular weight, is preferably 500 or higher, more preferably 1,000 or higher, even more preferably 1,500 or higher, and is preferably 5,000 or lower, more preferably 4,000 or lower, even more preferably 3,500 or lower.

By regulating the number-average molecular weight thereof so as to be not higher than the upper limit, the following effects are obtained. When a mixture of the polysiloxane polyol (a) described above and this polyether polyol (b) is prepared and a prepolymer and a prepolymer solution are formed from the mixture during the polyurethane production which will be described later, then the mixture, prepolymer, and solution are inhibited from suffering a severe increase in viscosity and improvements in handleability and productivity are attained. In addition, the polyurethane obtained can have improved low-temperature flexibility and improved stretch recovery.

On the other hand, by regulating the number-average molecular weight thereof so as to be not lower than the lower limit, not only the polyurethane to be obtained is prevented from being rigid and is rendered sufficiently flexible, but also strength and elastic performance, e.g., elongation, are sufficiently obtained.

Those values of number-average molecular weight were determined by the method for hydroxyl value (KOH(mg)/g) measurement based on acetylation in accordance with JIS K1557-1:2007.

The amounts of the polysiloxane polyol (a) and polyether polyol (b) to be used are not particularly limited. However, the amount of the polysiloxane polyol (a) to be used, based on the total weight of the polysiloxane polyol (a) and polyether polyol (b), is usually preferably 0.01% by weight or more, more preferably 0.03% by weight or more, even more preferably 0.05% by weight or more, especially preferably 0.07% by weight or more, most preferably 0.1% by weight or more.

The amount thereof is usually preferably 20% by weight or less, more preferably 17% by weight or less, even more preferably 15% by weight or less, especially preferably 12% by weight or less, most preferably 10% by weight or less.

By regulating the use amount of the polysiloxane polyol (a) so as to be not larger than the upper limit, the peeling property of the polyurethane to be obtained tends to be improved. When the use amount thereof is not less than the lower limit, the polyurethane obtained tends to be improved in elastic properties and extension recovery, although the polyurethane has reduced peeling property.

<1-1-3. Isocyanate Compound (c)>

The isocyanate compound (c) to be used in the invention is not particularly limited. Examples thereof include aromatic diisocyanates such as 2,4- or 2,6-tolylene diisocyanate, xylylene diisocyanate, 4,4'-diphenylmethane diisocyanate (MDI), 2,4'-MDI, p-phenylene diisocyanate, 1,5-naphthalene diisocyanate, and tolidine diisocyanate, aliphatic diisocyanates having an aromatic ring, such as $\alpha,\alpha,\alpha',\alpha'$-tetramethylxylylene diisocyanate, aliphatic diisocyanates such as methylene diisocyanate, propylene diisocyanate, lysine diisocyanate, 2,2,4- or 2,4,4-trimethylhexamethylene diisocyanate, and 1,6-hexamethylene diisocyanate, and alicyclic diisocyanates such as 1,4-cyclohexane diisocyanate, methylcyclohexane diisocyanate (hydrogenated TDI), 1-isocyanato-3-isocyanatomethyl-3,5,5-trimethylcyclohexane (IPDI), 4,4'-dicyclohexylmethane diisocyanate, and isopropylidenedicyclohexyl 4,4'-diisocyanate. These isocyanate compounds may be used alone or in combination of two or more thereof.

In the invention, aromatic diisocyanates having high reactivity are especially preferred. In particular, tolylene diisocyanate (TDI) and diphenylmethane diisocyanate (MDI) are preferred.

An isocyanate compound in which the NCO groups have been partly altered to a urethane, urea, biuret, allophanate, carbodiimide, oxazolidone, amide, imide, or the like may also be used. The polynuclear compounds include isomers other than those shown above.

The amount of such isocyanate compounds (c) to be used, per equivalent of the sum of the hydroxyl groups of the polysiloxane polyol (a) and polyether polyol (b) and the hydroxyl and/or amino groups of the chain extender (d), is usually preferably 0.1-5 equivalents, more preferably 0.8-2 equivalents, even more preferably 0.9-1.5 equivalents, most preferably 0.95-1.2 equivalents, especially preferably 0.98-1.1 equivalent.

By regulating the use amount of the isocyanate compound to 5 equivalents or less, the trouble that unreacted isocyanate groups undergo undesirable reactions is prevented, making it easy to obtain desired properties. By regulating the amount thereof to 0.1 equivalent or more, a polyurethane and a polyurethane-urea which have a sufficiently increased molecular weight can be obtained, making it easy to impart desired performances thereto.

<1-1-4. Chain Extender (d)>

Chain extenders (d) which can be used in the invention are classified mainly as compounds having two or more hydroxyl groups, compounds having two or more amino groups, and water. Of these, short-chain polyols, specifically, compounds having two or more hydroxyl groups, are preferred for use in polyurethane production. For use in polyurethane-urea production, polyamine compounds, specifically, compounds having two or more amino groups, are preferred.

With respect to water as one example of the chain extenders (d), it is preferred to minimize the amount thereof from the standpoint of stably conducting the reaction. Use of a combination of compounds having a molecular weight (number-average molecular weight) of 500 or less as a chain extender (d) is more preferred from the standpoint of the properties of the polyurethane of the invention since the polyurethane elastomer thus produced has improved rubber elasticity. Those chain extenders (d) may be used alone or in combination of two or more thereof.

Examples of the compounds having two or more hydroxyl groups include aliphatic glycols such as ethylene glycol, diethylene glycol, triethylene glycol, propylene glycol, dipropylene glycol, tripropylene glycol, 1,3-propanediol, 2-methyl-1,3-propanediol, 2-methyl-2-propyl-1,3-propanediol, 2-butyl-2-ethyl-1,3-propanediol, 2-butyl-2-hexyl-1,3-propanediol, 1,2-butanediol, 1,3-butanediol, 1,4-butanediol, 2,3-butanediol, 1,5-pentanediol, 2-methyl-2,4-pentanediol, 3-methyl-1,5-pentanediol, 2,2,4-trimethyl-1,3-pentanediol, neopentyl glycol, 1,6-hexanediol, 2-ethyl-1,3-hexanediol, 2,5-dimethyl-2,5-hexanediol, 1,8-octanediol, 2-methyl-1,8-octanediol, and 1,9-nonanediol, alicyclic glycols such as bishydroxymethylcyclohexane, and glycols having an aromatic ring, such as xylylene glycol and bishydroxyethoxybenzene.

Examples of the compounds having two or more amino groups include aromatic diamines such as 2,4- or 2,6-tolylenediamine, xylylenediamine, and 4,4'-diphenylmethanediamine, aliphatic diamines such as ethylenediamine, 1,2-propylenediamine, 2,2-dimethyl-1,3-propanediamine, 1,3-pentanediamine, 2-methyl-1,5-pentanediamine, 2-butyl-2-ethyl-1,5-pentanediamine, 1,6-hexanediamine, 2,2,4- or 2,4,4-trimethylhexanediamine, 1,8-octanediamine, 1,9-nonanediamine, and 1,10-decanediamine, and alicyclic diamines such as 1-amino-3-aminomethyl-3,5,5-trimethylcyclohexane (IPDA), 4,4'-dicyclohexylmethanediamine (hydrogenated MDA), isopropylidenecyclohexyl-4,4'-diamine, 1,4-diaminocyclohexane, and 1,3-bisaminomethylcyclohexane. Preferred of these are ethylenediamine, propylenediamine, 1,3-pentanediamine, and 2-methyl-1,5-pentanediamine.

The amount of these chain extenders (d) to be used, per equivalent of the amount obtained by subtracting the amount in equivalent of the isocyanate compound (c) from the total amount in equivalent of the hydroxyl groups of the polysiloxane polyol (a) and polyether polyol (b), is usually preferably 0.1-5.0 equivalents, more preferably 0.8-2.0 equivalents, even more preferably 0.9-1.5 equivalents.

By regulating the use amount of the chain extender (d) so as to be not larger than the upper limit, the polyurethane and polyurethane-urea to be obtained are prevented from being too rigid and desired properties can be obtained. The polyurethane and the polyurethane-urea are easily soluble in solvents and are easy to process. When the amount thereof is not less than the lower limit, the polyurethane obtained is not too flexible, has sufficient strength, stretch recovery, and elasticity retentivity, and has satisfactory high-temperature characteristics.

<1-1-5. Other Additives, Etc. (e)>

In the invention, a chain terminator having one active-hydrogen group can be used for polyurethane production according to need in order to regulate the molecular weight of the polyurethane, besides the ingredients (a) to (d) described above.

Examples of the chain terminator include aliphatic monools having a hydroxyl group, such as ethanol, propanol, butanol, and hexanol, and aliphatic monoamines having an amino group, such as diethylamine, dibutylamine, n-butylamine, monoethanolamine, and diethanolamine. These chain terminators may be used alone or in combination of two or more thereof.

Other additives may be added during polyurethane production according to need. Examples of the additives include antioxidants such as "CYANOX 1790" (manufactured by CYANAMID Co.), "IRGANOX 245" and "IRGANOX 1010" (both manufactured by Ciba Specialty Chemicals Co.), "Sumilizer GA-80" (manufactured by Sumitomo Chemical Co., Ltd.), and 2,6-dibutyl-4-methylphenol (BHT), light stabilizers such as "TINUVIN 622LD" and "TINUVIN 765" (both manufactured by Ciba Specialty Chemicals Co.) and "SANOL LS-2626" and "SANOL LS-765" (both manufactured by Sankyo Ltd.), ultraviolet absorbers such as "TINUVIN 328" and "TINUVIN 234" (both manufactured by Ciba Specialty Chemicals Co.), silicone compounds such as dimethylsiloxane/polyoxyalkylene copolymers, addition and reaction type flame retardants such as red phosphorus, organophosphorus compounds, phosphorus- and halogen-containing organic compounds, bromine- or chlorine-containing organic compounds, ammonium polyphosphate, aluminum hydroxide, and antimony oxide, colorants including pigments such as titanium dioxide, dyes, and carbon blacks, hydrolysis inhibitors such as carbodiimide compounds, fillers such as short glass fibers, carbon fibers, alumina, talc, graphite, melamines, and clay, lubricants, oils, surfactants, other inorganic extenders, and organic solvents.

<1-2. Production of Polyurethane>

In the invention, a polyurethane can be produced using the polysiloxane polyol (a), a polyether polyol (b), an isocyanate compound (c), and a chain extender (d) as main raw materials therefor in the respective amounts described above by any of all production processes in general experimental/industrial use, in the absence or presence of a solvent.

The solvent to be used for the production is not particularly limited. However, from the standpoints of suitability for general-purpose use, dissolving properties, etc., it is preferred to use a solvent selected from the group consisting of amide solvents such as N,N-dimethylacetamide, N,N-dimethylformamide, and mixtures of the two or more thereof, N-methylpyrrolidone, N-ethylpyrrolidone, and dimethyl sulfoxide. Especially preferred of these are N,N-dimethylformamide and N,N-dimethylacetamide.

Examples of production processes include: a process in which the ingredients (a), (b), (c), and (d) are reacted together (hereinafter referred to as one-step method); a process which includes first mixing the ingredient (a) with the ingredient (b), reacting the mixture with the ingredient (c) to prepare a prepolymer in which each of both ends is terminated by an isocyanate group, and then reacting the prepolymer with the ingredient (d) (hereinafter referred to as two-step method); a process which includes reacting the ingredient (b) with the ingredient (c), subsequently mixing the ingredient (a) therewith, and reacting this mixture with the ingredient (d); and a process in which the ingredients (b), (c), and (d) are reacted and the ingredient (a) is subsequently mixed therewith.

Of these methods, the two-step method is a process that includes a step in which a polyether polyol (b) is reacted beforehand with at least one equivalent of an isocyanate compound (c) to thereby prepare an intermediate terminated with an isocyanate at each end, the intermediate corresponding to soft segments of a polyurethane. In the two-step method, the prepolymer prepared first is reacted with a chain extender (d). The two-step method hence has the following features: it is easy to regulate the molecular weight of soft-segment portions; phase separation between soft segments and hard segments is apt to occur sufficiently; and the performances required of elastomers are easy to impart.

Especially when the chain extender (d) is a diamine, it is preferred to use the two-step method to produce a polyurethane-urea because the hydroxyl groups of the polyether polyol considerably differ from the amino groups of the diamine in the rate of reaction with the isocyanate groups.

Furthermore, the polyurethane production process in which a mixture of the ingredients (a) and (b) is reacted with the ingredient (c) to prepare a prepolymer terminated by an isocyanate group at each end and, thereafter, this prepolymer is reacted with the ingredient (d) is considered to be the most preferred process because the polysiloxane polyol (a) is incorporated into the molecular structure of the polyurethane and hence is less apt to bleed out (separate out or precipitate) in the step of polyurethane molding and because the molded polyurethane hence has intact peeling property.

Meanwhile, still another example of processes for polyurethane production is the method in which the ingredients (b), (c), and (d) are reacted and, thereafter, the ingredient (a) is mixed therewith. In this method, however, the polysiloxane polyol (a) is less apt to be incorporated into the molecular structure of the polyurethane. Consequently, the ingredient (a) is apt to bleed out in the step of polyurethane molding, and the molded polyurethane tends not to show the desired peeling property. In addition, the polysiloxane polyol (a) is required to be used in a large amount in order to obtain sufficient peeling property, and this tends to result in an increase in cost. This method hence is undesirable.

The method in which a polyol mixture is prepared beforehand from the polysiloxane polyol (a) and the polyether polyol (b) is not particularly limited. However, in the case where the polysiloxane polyol (a) and the polyether polyol (b) are both liquid, it is preferred to stir and mix these polyols. In the case where one or each of these ingredients is a solid or a high-viscosity liquid, the solid or high-viscosity ingredient(s) may be mixed after having been heated and converted into a low-viscosity liquid.

The temperature at which the ingredients are mixed is not limited. However, it is preferred to mix at 10-110° C. By regulating the temperature to 110° C. or lower, the polyol mixture can be prevented from taking a color. By regulating the temperature to 10° C. or higher, partial solidification of the polyols is prevented to improve working efficiency, and the polyols are prevented from being unevenly mixed. Thus, a polyurethane having excellent peeling property and homogeneity can be stably produced.

The closer to 0 the Hazen color number of the polyol mixture, the more the mixture is preferred. The upper limit of the Hazen color number thereof is usually preferably 400 or less, more preferably 200 or less, even more preferably 100 or less, especially preferably 50 or less. By regulating the Hazen color number thereof so as not to be higher than the upper limit, the molded polyurethane can be prevented from considerably taking a color.

Since the polysiloxane polyol (a) and the polyether polyol (b) have satisfactory compatibility with each other, the polyol mixture prepared beforehand has a feature in that this mixture does not suffer phase separation even when the polyols in the thus-mixed state are stored over a long period.

It is also preferred that when the polyurethane of the invention which will be described later is produced, the polysiloxane polyol (a) and the polyether polyol (b) should be introduced through separate lines and mixed or dispersed to prepare a polyol mixture.

In the case where the polysiloxane polyol (a) and the polyether polyol (b) are to be introduced through separate lines, the only thing necessary for the production of a special-grade polyurethane having excellent peeling property is to add a tank for the polysiloxane polyol of the invention and a feed line therefor to ordinary polyurethane production equipment.

In case where a polyol mixture is prepared and then introduced into the polyether polyol storage tank of ordinary polyurethane production equipment, there may be a possibility that the polysiloxane polyol might coexist when a general-grade polyurethane is produced, resulting in impaired homogeneity of the polyurethane.

For efficiently producing a general-grade polyurethane and a special-grade polyurethane each having desired properties, it is preferred to introduce the polysiloxane polyol (a) and the polyether polyol (b) through separate lines as stated above.

<1-2-1. One-Step Method>

The one-step method, which is also called a one-shot method, is a method in which the ingredients (a), (b), (c), and (d) are fed together and thereby reacted. It is usually preferred that the ingredients are reacted at 0-250° C.

The reaction temperature varies depending on the amount of a solvent, reactivity of the raw materials used, reaction equipment, etc. In case where the temperature is too low, the reaction proceeds too slowly or the raw materials and the product of polymerization have reduced solubility, resulting in poor productivity. In case where the temperature is too high, side reactions and polyurethane decomposition occur. Too low temperatures and too high temperatures are hence undesirable.

The reaction may be conducted while degassing the system at a reduced pressure. A catalyst, a stabilizer, and the like can be added for the reaction according to need. Examples of the catalyst include triethylamine, tributylamine, dibutyltin dilaurate, stannous octylate, acetic acid, phosphoric acid, sulfuric acid, hydrochloric acid, and sulfonic acids.

Examples of the stabilizer include 2,6-dibutyl-4-methylphenol, distearyl thiodipropionate, di-β-naphthylphenylenediamine, and tri(dinonylphenyl) phosphite.

<1-2-2. Two-Step Method>

The two-step method is also called a prepolymer method. First, the polysiloxane polyol (a) is mixed with a polyether polyol (b), and an isocyanate compound (c) is reacted with the resultant polyol mixture to produce a prepolymer. Subsequently, an isocyanate compound (c) or an active-hydrogen compound ingredient selected from polyhydric alcohols, amine compounds, and the like is added to the prepolymer. Thus, a two-step reaction can be conducted.

Especially useful is a method in which the polyol mixture is reacted with an isocyanate compound (c) used in an amount not less than equivalent to the polyol mixture, thereby forming a prepolymer terminated by NCO at each end, and a short-chain diol or diamine is caused, as a chain extender (d), to act on the prepolymer to obtain a polyurethane.

The two-step method can be conducted in the absence or presence of a solvent. In the case where the method is practiced in the presence of a solvent, it is preferred from the standpoints of suitability for general-purpose use, dissolving properties, etc., to use a solvent selected from the group consisting of amide solvents such as N,N-dimethylacetamide, N,N-dimethylformamide, and mixtures of the two or more thereof, N-methylpyrrolidone, N-ethylpyrrolidone, and dimethyl sulfoxide. Especially preferred of these are N,N-dimethylformamide and N,N-dimethylacetamide.

In the case where a prepolymer is to be synthesized, use may be made of: (1) a method in which a prepolymer is first synthesized by directly reacting an isocyanate compound (c) with the polyol mixture without using a solvent, and the prepolymer is used as such; (2) a method in which a prepolymer is synthesized by method (1) and then dissolved in a solvent and used; or (3) a method in which an isocyanate compound (c) is reacted with the polyol mixture using a solvent from the beginning.

In the case of method (1), it is preferred in the invention that a polyurethane in the state of being coexistent with a solvent should be obtained, for example, by a method in which a chain extender (d) is dissolved in a solvent before being caused to act on the prepolymer or by a method in which the prepolymer and a chain extender (d) are simultaneously introduced into a solvent.

The NCO/active-hydrogen group (polyol mixture) equivalent ratio is usually preferably 1 or larger, more preferably 1.05 or larger. The equivalent ratio thereof is usually preferably 10 or less, more preferably 5 or less, even more preferably 3 or less.

By regulating the NCO/active-hydrogen group (polyol mixture) equivalent ratio so as to be not larger than the upper limit, the excess isocyanate groups can be prevented from causing side reactions and satisfactory polyurethane properties are obtained. By regulating the equivalent ratio thereof so as to be not less than the lower limit, the molecular weight of the polyurethane to be obtained can be sufficiently improved and sufficient strength and thermal stability are obtained.

The amount of the chain extender (d) to be used is not particularly limited. However, the amount thereof is usually preferably not less than 0.1 equivalent, more preferably not less than 0.8 equivalents, to the NCO groups contained in the prepolymer. The amount thereof is usually preferably not more than 5.0 equivalents, more preferably not more than 2.0 equivalents, to the NCO groups.

It is preferred that a chain extension reaction should be conducted usually by reacting the ingredients at 0-250° C. The reaction temperature varies depending on the amount of the solvent, reactivity of the raw materials used, reaction equipment, etc. In case where the temperature is too low, the reaction proceeds too slowly or the raw materials and the product of polymerization have reduced solubility, resulting in poor productivity. In case where the temperature is too high, side reactions and polyurethane decomposition occur. Too low temperatures and too high temperatures are hence undesirable. The reaction may be conducted while degassing the system at a reduced pressure.

A catalyst, a stabilizer, and the like can be added for the reaction according to need. Examples of the catalyst include triethylamine, tributylamine, dibutyltin dilaurate, stannous octylate, acetic acid, phosphoric acid, sulfuric acid, hydrochloric acid, and sulfonic acids.

Examples of the stabilizer include 2,6-dibutyl-4-methylphenol, distearyl thiodipropionate, di-β-naphthylphenylenediamine, and tri(dinonylphenyl) phosphite.

It is, however, preferred that in the case where the chain extender is a highly reactive chain extender, e.g., a short-chain aliphatic amine, the chain extension reaction should be conducted without adding a catalyst. A monofunctional organic amine and a monofunctional alcohol may be caused to coexist during the reaction.

<2. Properties of the Polyurethane>

The polyurethane produced by the production process described above is generally obtained in the state of having been dissolved in a solvent, since the reactions usually were conducted in the presence of a solvent. However, whether the polyurethane is in a solution state or a solid state is not limited.

In the invention, the weight-average molecular weight (Mw) of the polyurethane as determined by gel permeation chromatography (GPC) is usually preferably 10,000-1,000,000, more preferably 50,000-500,000, even more preferably 100,000-400,000, especially preferably 150,000-300,000, although the molecular weight thereof varies depending on applications.

The ratio of the weight-average molecular weight (Mw) to the number-average molecular weight (Mn) thereof, the ratio (Mw/Mn) being a measure of molecular-weight distribution, is preferably 1.5-3.5, more preferably 1.7-3.0, especially preferably 1.8-3.0. The number-average molecular weight (Mn) also can be determined by the gel permeation chromatography (GPC).

The lower the peel strength during film formation from the polyurethane according to the invention, the more the film is preferred. The peel strength of the film is usually preferably 20 g/cm or less, more preferably 10 g/cm or less, even more preferably 5 g/cm or less, especially preferably 2 g/cm or less. By regulating the peel strength thereof to 20 g/cm or less, sufficient peeling property is imparted to the polyurethane polymer.

The polyurethane obtained by the production process described above has a hard-segment content of preferably 1-20% by weight, more preferably 3-15% by weight, even more preferably 4-12% by weight, especially preferably 5-10% by weight, based on the overall weight of the polyurethane.

By regulating the hard-segment content to 20% by weight or less, the polyurethane obtained is made to show sufficient flexibility and elastic performance and to be readily soluble and easy to process in the case of using a solvent. On the other hand, by regulating the hard-segment content to 1% by weight or more, the polyurethane is prevented from being too flexible and is made to have satisfactory processability and sufficient strength and elastic performance.

The content of hard segments in the invention means a value determined by calculating the proportion of the weight of combined isocyanate and chain extender moieties to the overall weight using the following equation on the basis of P. J. Flory, *Journal of American Chemical Society*, 58, 1877-1885 (1936).

$$\text{Hard segments}(\%) = [(R-1)(Mdi+Mda)/\{Mp+R\cdot Mdi+(R-1)\cdot Mda\}] \times 100$$

In the equation:

R=(number of moles of the isocyanate compound (c))/[(number of moles of hydroxyl groups of the polyether polyol (b))+(number of moles of hydroxyl groups of the polysiloxane polyol (a))]

Mdi=number-average molecular weight of the isocyanate compound (c)

Mda=number-average molecular weight of the chain extender (d)

Mp=number-average molecular weight of polyol mixture composed of the polysiloxane polyol (a) and the polyether polyol (b)

The polyurethane solution obtained when the reactions are conducted in the presence of a solvent has satisfactory storage stability since this solution, for example, is inhibited from gelling and suffers little change in viscosity with the time-dependent change. Furthermore, this polyurethane solution shows low thixotropic properties, and is hence suitable for processing into a film, fiber, etc.

The polyurethane concentration of the polyurethane solution is usually preferably 1-99% by weight, more preferably 5-90% by weight, even more preferably 10-70% by weight, especially preferably 15-50% by weight, based on the overall weight of the solution including the solvent and the polyurethane dissolved therein.

To regulate the polyurethane content so as to be not less than the lower limit eliminates the necessity of removing the solvent in a large amount, thereby attaining an improvement in productivity. On the other hand, by regulating the polyurethane content so as to be not higher than the upper limit, the solution can be inhibited from having too high a viscosity and the handleability and processability thereof can be improved.

Incidentally, in the case where the polyurethane solution is stored over a long period, it is preferred to store the solution at ordinary or a lower temperature in an inert gas atmosphere such as nitrogen, argon, etc.

<3. Molded Polyurethane>

The molded polyurethane of the invention is a molded object constituted of the polyurethane described above. Since the term "molded polyurethane" in the invention means a solid-state polyurethane as stated above, the solid-state polyurethane itself obtained by the production process described above is also within the scope of the molded polyurethane of the invention. Molded objects obtained by molding the polyurethane which is in a solid state or liquid state by known techniques are also within the scope thereof.

Methods for molding the polyurethane also are not particularly limited. Examples of the molded polyurethane include molded objects obtained by molding the polyurethane into sheet, film, and fiber forms and the like by molding techniques such as extrusion molding and injection molding.

The invention further includes a molded polyurethane characterized in that atoms present in the surface of the molded object have a specific composition. Namely, the value of Si/C, which is the relative proportion of silicon atoms to carbon atoms in the surface of the molded object, is as follows. The lower limit thereof is 0.03 or larger, preferably 0.05 or larger, more preferably 0.06 or larger, even more preferably 0.08 or larger, especially preferably 0.10 or larger. In case where the Si/C ratio is less than the lower limit, the molded polyurethane has insufficient peeling property. Such too small values of Si/C are hence undesirable.

On the other hand, the upper limit thereof is 0.5 or less, preferably 0.4 or less, more preferably 0.3 or less, even more preferably 0.2 or less, especially preferably 0.15 or less. In case where the Si/C ratio exceeds the upper limit, the molded object obtained tends to be reduced in flexibility and transparency. Such too large values of Si/C are hence undesirable.

In the invention, the relative proportion of silicon atoms to carbon atoms in the surface of a molded object is determined by ESCA (electron spectroscopy for chemical analysis) or XPS (X-ray photoelectron spectroscopy). Consequently, the relative proportion of surface atoms as specified here, strictly speaking, is not the ratio of the numbers of atoms present in the outermost surface but the ratio of the numbers of atoms present in a part which has a thickness and is located in the region being analyzed.

The relative proportion in the surface of the molded object can be regulated, for example, by changing the amount of the polysiloxane polyol (a) or polyether polyol (b) to be added, changing the sequence of addition of the polysiloxane polyol, or using polysiloxane polyols differing in the content of a polysiloxane moiety or polyoxyalkylene moiety.

<4. Applications of the Polyurethane>

The polyurethane produced by the invention and the urethane prepolymer solution therefor can be made to exhibit a variety of properties. For example, the polyurethane and the urethane prepolymer solution may be used as a resinous or rubbery material or as a material in a thermoplastic elastomer state or the like, and may be used in a solid or foam state molded into various shapes or in a liquid or another state. The polyurethane and urethane prepolymer solution in such forms or states may be used as fibers, films, coating materials, adhesives, functional parts, etc. in a wide range of fields including clothing, sanitary articles, packaging, civil engineering, architecture, medical treatments, motor vehicles, domestic electrical appliances, and other industrial parts.

It is especially preferred that the polyurethane produced by the invention should be used as fibers or films, from the standpoint of taking advantage of the elastic properties and moisture permeability which are characteristic of the polyurethane. With respect to specific applications thereof, it is preferred to use the polyurethane as elastic fibers for clothing, medical or sanitary articles, artificial leathers, and the like.

<4-1. Polyurethane Film>

The film formed from the polyurethane of the invention is not particularly limited in the thickness thereof. However, the thickness thereof is usually preferably 10-1,000 μm, more preferably 10-500 μm, even more preferably 10-100 μm. By regulating the thickness of the film to 1,000 μm or less, sufficient moisture permeability is obtained. When the thickness thereof is regulated to 10 μm or more, pin-holes are less apt to be formed and the film is less apt to suffer blocking and is easy to handle.

The film formed from the polyurethane of the invention is suitable for use as a pressure-sensitive adhesive film for medical use, a sanitary material, a packaging material, a decorative film, a moisture permeable material, etc. Such a film may be a film formed through coating-fluid application to a support, e.g., fabric or nonwoven fabric. In this case, the thickness thereof may be less than 10 μm.

With respect to tensile properties, the rupture strength of the film is usually preferably 5 MPa or higher, more preferably 10 MPa or higher, even more preferably 20 MPa or higher, especially preferably 30 MPa or higher. The elongation at rupture thereof is usually preferably 100% or higher, more preferably 200% or higher, even more preferably 300% or higher, especially preferably 500% or higher.

Processes for producing a film from the polyurethane of the invention are not particularly limited, and conventionally known processes can be used. Examples thereof include a wet film formation method in which a polyurethane solution is applied or cast on a support or release material and the solvent and other soluble substances are extracted in a coagulation bath and a dry film formation method in which a polyurethane solution is applied or cast on a support or release material and the solvent is removed by heating, pressure reduction, etc.

The support to be used for film formation is not particularly limited. Use may be made of a polyethylene film, polypropylene film, glass, metal, paper or fabric coated with a release agent, or the like. Although methods for the application are not particularly limited, any of known devices such as a knife coater, roll coater, spin coater, and gravure coater may be used.

Any desired drying temperature can be set according to the kind of the solvent, ability of the dryer, etc. It is, however, necessary to select a temperature range where neither insufficient drying nor abrupt solvent removal occurs. The drying temperature is preferably in the range of ordinary temperature to 300° C., more preferably in the range of 60-200° C.

<4-2. Polyurethane Fiber>

The properties of a polyurethane film highly correlate with the properties of a polyurethane fiber, and there are many cases where property values obtained in film tests or the like tend to be the same as in fiber tests. The fiber formed from the polyurethane of the invention is excellent in terms of extension recovery, elasticity, hydrolytic resistance, light resistance, oxidation resistance, oil resistance, processability, etc.

The fiber formed from the polyurethane of the invention is suitable for use in applications such as legs, panty hose, diaper covers, paper diapers, sports wear, underwear, stockings, fashionable stretch garments, swimming wear, and leotards.

The elastic fiber formed from the polyurethane of the invention has excellent moisture permeability, which is characterized in that when such elastic fibers are used as a garment, the garment is less apt to give a stuffy feeling and is comfortable to wear. The property of being low in the coefficient of stress fluctuation or in modulus means, for example, that when the garment is put on, the arms can be passed through the sleeves with small force. This garment has a feature in that the garment is extremely easy to put on and take off even for a small child or an aged person.

Furthermore, since the fiber gives a satisfactory sense of fit and has satisfactory conformability to movements, the fiber can be used in applications such as sports wear and more fashionable garments. Moreover, as apparent from the fact that the fiber has a high retention of elasticity in a cyclic extension test, the fiber has a feature in that the elastic properties thereof are less apt to be impaired even through repetitions of use.

EXAMPLES

The invention will be explained below in more detail by reference to Examples. However, the invention should not be construed as being limited by the following Examples unless the invention departs from the spirit thereof. The analyses and measurements in the following Examples, Reference Examples, and Comparative Example were made by the following methods.

<Number-Average Molecular Weight of Polysiloxane Polyol (a)>

When the polyether polyol (ii) is present in an amount of at least 2 equivalents to the polycarboxylic acid or polycarboxylic acid ester (i) having a polysiloxane framework, then the number-average molecular weight of the polyester polyol (a-1) can be calculated from the molecular weights of the raw materials in accordance with the following [Equation 1]. The number-average molecular weights of polysiloxane polyols 1 and 2, which were used in Examples, were calculated using [Equation 1].

The number-average molecular weight of a polysiloxane polyol (a-4) can be calculated from the weights of the carbinol-modified silicone and ε-caprolactone which were fed as a raw material, using [Equation 2]. The number-average molecular weights of polysiloxane polyols 4 and 5 were calculated using [Equation 2]. However, since polysiloxane polyols 3 and 6, which were used in Examples, were commercial products, the values of number-average molecular weight given in catalogs supplied by the manufacturers are shown.

Number-average molecular weight of polysiloxane polyol 1 or 2=(molecular weight of polycarboxylic acid (*i*) having polysiloxane framework)+ (molecular weight of polyether polyol (*ii*))×2− (molecular weight of water)×2     [Equation 1]

Number-average molecular weight of polysiloxane polyol 4 or 5=(molecular weight of carbinol-modified silicone)+((weight of fed ε-caprolactone)/(molecular weight of ε-caprolactone))/{ (weight of fed carbinol-modified silicone)/ (molecular weight of carbinol-modified silicone) }×(molecular weight of ε-caprolactone)     [Equation 2]

<Number-Average Molecular Weights of Polyether Polyol (ii) and Polyether Polyol (b)>

The number-average molecular weights thereof were determined by the method for hydroxyl value (KOH(mg)/g) measurement based on acetylation in accordance with JIS K1557-1:2007.

<Molecular Weights of Polyurethane and Polyurethane-Urea>

With respect to the molecular weight of a polyurethane or polyurethane-urea obtained, a dimethylacetamide solution of the polyurethane or polyurethane-urea was prepared and examined for number-average molecular weight (Mn) and weight-average molecular weight (Mw), both calculated for standard polystyrene, using a GPC apparatus [product name "HLC-8220", manufactured by Tosoh Corp. (columns: Tskgel GMH-XL (two)].

<Transparency of Polyurethane-Urea Solution>

A 100-mL portion of a polyurethane-urea solution was placed in a standard transparent glass bottle (150 mL; "PS-13K", manufactured by Daiichi Glass Co.), and this bottle was viewed exactly from a lateral direction to visually examine the transparency of the solution. The solution was evaluated on the basis of the following criteria.

Good: Transparent.

Fair: The solution is slightly cloudy and is not transparent, although the colors, etc. of the scene behind the bottle can be seen through the bottle.

Poor: The solution is cloudy and the scene behind the bottle cannot be seen at all through the bottle.

<Method for Peeling Test>

Two sheets of a molded film were superposed, and two test pieces each having a length of 4 cm and a width of 1 cm were punched out thereof. Under the conditions of a temperature of 25° C. and a relative humidity of 50%, a pressure of 200 g/cm$^2$ was applied for 10 minutes to the superposed portion which ranged from one length-direction end to a distance of 2.5 cm therefrom. With respect to the resultant test specimen, the press-bonded parts were subjected to T-peeling using a tensile tester ("Rheometer NRM-2003J", manufactured by FUDOH) at a crosshead speed of 300 mm/min to measure the peel strength thereof.

<Film Properties>

A strip-shaped test piece having a width of 10 mm and a length of 100 mm (thickness, about 50 μm) which had been punched out of a molded film was examined for stress at 100% elongation, stress at 300% elongation, tensile strength at rupture, and tensile elongation at rupture using a tensile tester (product name "Tensilon UTM-III-100", manufactured by Orientec Co., Ltd.) under the conditions of a temperature of 23° C., a relative humidity of 55%, a chuck-to-chuck distance of 50 mm, and a crosshead speed of 500 mm/min in accordance with JIS K6301.

<Relative Proportion (Surface Atom Composition)>

The relative proportion of silicon atoms to carbon atoms in the surface of a molded polyurethane, i.e., the surface atom composition, was determined through an examination by ESCA (electron spectroscopy for chemical analysis). The examination was made with ESCA apparatus "ESCA-5800", manufactured by ULVAC-PHI, Inc. The examination conditions were as follows.

Excitation X rays: monochromatic A1Kα line (1,486.7 eV)

X-ray output: 14 kV; 350 W (neutralizing gun was used for prevention of static buildup)

Analysis mode (LENS MODE): 5 (minimum-range mode)

Aperture number: 5

Detection angle (angle between detector and normal line to sample): 45 degrees

Pass energy: 23.5 eV

Charge shift correction: The correction was made so that the bond energy of the carbon C1s peak was adjusted to 235.0 eV.

The relative proportion of oxygen atoms to carbon atoms was calculated using the following equation.

Relative proportion=[(area of oxygen O1*s* peak)/(relative sensitivity coefficient for peak correction)]/ [(area of carbon C1*s* peak)/(relative sensitivity coefficient for peak correction)]

The area of each peak was determined by conducting smoothing (9 points) by Savitzky-Golay algorithm using software MultiPak Ver. 8.2C attached to the apparatus and making Shirley's background correction. The oxygen atom peak and carbon atom peak bond energies used for calculating the relative proportion and the sensitivity coefficients for correction used in software MultiPak Ver. 8.2C are as follows.

O1s: bond energy=around 532.5 eV
Relative sensitivity coefficient for correction=13.118
C1s: bond energy=around 285.0 eV
Relative sensitivity coefficient for correction=5.220

As the area of the carbon C1s peak, use was made of the sum of the area obtained by connecting the minimum values appearing at around 280 eV and 290.5 eV by means of Shirley's correction and the area of the peak (around 291-293 eV) assigned to benzene ring shake-up which was obtained by connecting the minimum values appearing at around 290.5 eV and 293 eV by means of Shirley's correction.

Example 1

Production of Polysiloxane Polyol 1

Into a 100-mL four-necked round-bottom flask equipped with a stirrer were introduced 4.4 mg of tetrabutyl orthotitanate (manufactured by Tokyo Kasei Kogyo Co., Ltd.), 30.0 g (20.0 mmol) of a carboxylic-acid-modified silicone having a carboxyl group at each molecular end of the polydimethylsiloxane framework ("BY16-750", manufactured by Dow Corning Toray Co., Ltd.; number-average molecular weight, 1,500) as a polycarboxylic acid (i-1) having a polysiloxane framework, and 27.4 g (42.2 mmol) of polytetramethylene ether glycol (number-average molecular weight, 650; manufactured by Mitsubishi Chemical Corp.) as a polyether polyol (ii).

A distillate tube and a nitrogen introduction tube were attached thereto, and the distillate part was kept at 120° C. with a tape heater. The reaction vessel was immersed in an oil bath and thereby heated to 200° C. over 30 minutes, and the reaction mixture was reacted at 200° C. for 7 hours to obtain a polysiloxane polyol 1 (number-average molecular weight, 2,764; polydimethylsiloxane content, 40% by weight).

From the composition of the raw materials and from the results of NMR analysis of the product, the polysiloxane polyol 1 was presumed to have a structure represented by structural formula (1) wherein n=15, x=1, y=9, $R_1$=alkylene group having 11 carbon atoms, and $R_2$=alkylene group having 4 carbon atoms. The polysiloxane polyol 1 was found to have a structure which satisfied structural formula (1).

<Production of Polyurethane-Urea 1>

Into a flask having a capacity of 1 L were introduced 109.2 parts by weight of polytetramethylene ether glycol (hereinafter often abbreviated to "PTMG") (number-average molecular weight, 1,972; manufactured by Mitsubishi Chemical Corp.) which had been heated at 40° C. beforehand, as a polyether polyol (b), and 0.55 parts by weight of the polysiloxane polyol 1 synthesized above, as a polysiloxane polyol (a). The ingredients were mixed together, and this mixture was used as a raw material for polyurethane production. The proportion of the polysiloxane polyol 1 to this mixture was 0.5% by weight.

Thereafter, 22.2 parts by weight of 4,4'-diphenylmethane diisocyanate (hereinafter often abbreviated to "MDI") which had been heated at 40° C. beforehand was added as an isocyanate compound (c). In the resultant mixture, the NCO/active-hydrogen group (polysiloxane polyol and polyether polyol) equivalent ratio was 1.6.

This flask was set on a 45° C. oil bath. While the contents were being stirred with an anchor-shaped stirring blade in a nitrogen atmosphere, the temperature of the oil bath was elevated to 70° C. over 1 hour and then kept at 70° C. for 3 hours.

The residual NCO groups were reacted with excess dibutylamine and, thereafter, the residual dibutylamine was subjected to back titration with hydrochloric acid. As a result, the conversion of the NCO groups was ascertained to have exceeded 99%. Thereafter, the oil bath was removed, and 198 parts by weight of N,N-dimethylacetamide (hereinafter often abbreviated to "DMAC"; manufactured by Kanto Chemical Co., Inc.) was introduced into the flask. The resultant mixture was stirred at ordinary temperature to dissolve the reaction product. Thus, a polyurethane prepolymer solution was prepared.

The polyurethane prepolymer solution was cooled to 10° C. and held at this temperature. On the other hand, a 0.6% DMAC solution of ethylenediamine (EDA)/diethylamine (DEA)=89/11 (molar ratio) was prepared as a chain extender (d). The polyurethane prepolymer solution cooled and held at 10° C. was added to the 0.6% DMAC solution which was kept being agitated at a high speed. Thus, a satisfactorily transparent polyurethane-urea DMAC solution having a polymer concentration of 20% was obtained.

This solution was aged at 25° C. overnight. Thereafter, the polyurethane urea 1 obtained was examined for weight-average molecular weight (Mw) and number-average molecular weight (Mn) by GPC, and the ratio (Mw/Mn) of the weight-average molecular weight (Mw) to the number-average molecular weight (Mn) was calculated as a measure of molecular-weight distribution. As a result, the Mw and the Mw/Mn were found to be 216,000 and 2.5, respectively. The polyurethane-urea 1 obtained had a content of hard segments of 7.7% by weight.

The polyurethane-urea 1 solution thus obtained was cast on a glass plate and dried at 60° C. to obtain a colorless and transparent film having a thickness of about 50 μm. This film was subjected to the peeling test. As a result, the film had a peel strength of 1.0 g/cm, showing that the film had satisfactory peeling property. The elastic film obtained had the properties shown in Table 1.

Example 2

Production of Polysiloxane Polyol 2

A polysiloxane polyol 2 (number-average molecular weight, 3,482; polydimethylsiloxane content, 32% by weight) was produced in the same manner as in Example 1, except that 33.8 g (33.8 mmol) of polytetramethylene ether glycol (number-average molecular weight, 1,009; manufactured by Mitsubishi Chemical Corp.) was used in place of the polytetramethylene ether glycol (number-average molecular weight, 650; manufactured by Mitsubishi Chemical Corp.) used as a polyether polyol (ii), and that the amount of the tetrabutyl orthotitanate was changed to 5.2 mg and the amount of the carboxylic-acid-modified silicone ("BY16-750", manufactured by Dow Corning Toray Co., Ltd.) as a polycarboxylic acid (i) having a polysiloxane framework was changed to 24.1 g (16.1 mmol).

From the composition of the raw materials and from the results of NMR analysis of the product, the polysiloxane polyol 2 was presumed to have a structure represented by structural formula (1) wherein n=15, x=1, y=14, $R_1$=alkylene group having 11 carbon atoms, and $R_2$=alkylene group having 4 carbon atoms. The polysiloxane polyol 2 was found to have a structure which satisfied structural formula (1).

<Production of Polyurethane-Urea 2>

A satisfactorily transparent solution of a polyurethane-urea 2 was obtained in the same manner as in Example 1, except that the amount of the polytetramethylene ether glycol (number-average molecular weight, 1,972; manufactured by Mitsubishi Chemical Corp.) used as a polyether polyol (b) was changed to 88.6 parts by weight, that the polysiloxane polyol 2 synthesized above was used as a polysiloxane polyol (a) in an amount of 0.90 parts by weight, and that the amount of the MDI used as an isocyanate compound (c) was changed to 18.1 parts by weight.

This solution was aged at 25° C. overnight. Thereafter, the polyurethane-urea 2 obtained was examined by GPC. As a result, the Mw and Mw/Mn thereof were found to be 191,000 and 2.6, respectively. The polyurethane-urea 2 obtained had a content of hard segments of 7.7% by weight.

A film was formed from the thus-obtained polyurethane-urea 2 solution in the same manner as in Example 1 and subjected to the peeling test. As a result, the film had a peel strength of 1.1 g/cm, showing that the film had satisfactory peeling property. The elastic film obtained had the properties shown in Table 1.

Example 3

Production of Polyurethane-Urea 3

A satisfactorily transparent solution of a polyurethane-urea 3 was obtained in the same manner as in Example 1, except that the amount of the polytetramethylene ether glycol (number-average molecular weight, 1,972; manufactured by Mitsubishi Chemical Corp.) used as a polyether polyol (b) was changed to 94.8 parts by weight, that the polysiloxane polyol 2 synthesized above was used as a polysiloxane polyol (a) in an amount of 8.30 parts by weight, and that the amount of the MDI used as an isocyanate compound (c) was changed to 20.3 parts by weight.

This solution was aged at 25° C. overnight. Thereafter, the polyurethane-urea 3 obtained was examined by GPC. As a result, the Mw and Mw/Mn thereof were found to be 133,000 and 2.6, respectively. The polyurethane-urea 3 obtained had a content of hard segments of 7.5% by weight.

A film was formed from the thus-obtained polyurethane-urea 3 solution in the same manner as in Example 1 and subjected to the peeling test. As a result, the film had a peel strength of 1.6 g/cm, showing that the film had satisfactory peeling property. The elastic film obtained had the properties shown in Table 1.

Example 4

Production of Polyurethane-Urea 4

A satisfactorily transparent solution of a polyurethane-urea 4 was obtained in the same manner as in Example 1, except that the amount of the polytetramethylene ether glycol (number-average molecular weight, 1,972; manufactured by Mitsubishi Chemical Corp.) used as a polyether polyol (b) was changed to 132.7 parts by weight, that the polysiloxane polyol 2 synthesized above was used as a polysiloxane polyol (a) in an amount of 0.67 parts by weight, and that the amount of the MDI used as an isocyanate compound (c) was changed to 27.0 parts by weight.

This solution was aged at 25° C. overnight. Thereafter, the polyurethane-urea 4 obtained was examined by GPC. As a result, the Mw and Mw/Mn thereof were found to be 231,000 and 2.4, respectively. The polyurethane-urea 4 obtained had a content of hard segments of 7.8% by weight.

A film was formed from the thus-obtained polyurethane-urea 4 solution in the same manner as in Example 1 and subjected to the peeling test. As a result, the film had a peel strength of 1.1 g/cm, showing that the film had satisfactory peeling property. The elastic film obtained had the properties shown in Table 1.

Example 5

Production of Polyurethane-Urea 5

A satisfactorily transparent solution of a polyurethane-urea 5 was obtained in the same manner as in Example 1, except that the amount of the polytetramethylene ether glycol (number-average molecular weight, 1,972; manufactured by Mitsubishi Chemical Corp.) used as a polyether polyol (b) was changed to 115.3 parts by weight, that the amount of the polyester polyol 1 synthesized above as a polysiloxane polyol (a) was changed to 1.16 parts by weight, and that the amount of the MDI used as an isocyanate compound (c) was changed to 23.6 parts by weight.

This solution was aged at 25° C. overnight. Thereafter, the polyurethane-urea 5 obtained was examined by GPC. As a result, the Mw and Mw/Mn thereof were found to be 229,000 and 2.2, respectively. The polyurethane-urea 5 obtained had a content of hard segments of 7.8% by weight.

A film was formed from the thus-obtained polyurethane-urea 5 solution in the same manner as in Example 1 and subjected to the peeling test. As a result, the film had a peel strength of 0.4 g/cm, showing that the film had satisfactory peeling property. The elastic film obtained had the properties shown in Table 1.

Example 6

Production of Polyurethane-urea 6

A satisfactorily transparent solution of a polyurethane-urea 6 was obtained in the same manner as in Example 1, except that the amount of the polytetramethylene ether glycol (number-average molecular weight, 1,972; manufactured by Mitsubishi Chemical Corp.) used as a polyether polyol (b) was changed to 130 parts by weight, that an ether-modified silicone (SF8427, manufactured by Dow Corning Toray Co., Ltd.; number-average molecular weight, 1,860; polydimethylsiloxane content, 32% by weight) was used as a polysiloxane polyol (a) in an amount of 0.65 parts by weight, and that the amount of the MDI used as an isocyanate compound (c) was changed to 26.7 parts by weight.

From the results of NMR analysis, the polysiloxane polyol 3 used above was presumed to have a structure represented by structural formula (I) wherein n=11, x=0, y=8-11, $R_1$=alkylene group having 3 carbon atoms, and $R_2$=alkylene group having 2 or 3 carbon atoms. The polysiloxane polyol 3 was found to have a structure which satisfied structural formula (1).

This solution was aged at 25° C. overnight. Thereafter, the polyurethane-urea 6 obtained was examined by GPC. As a result, the Mw and Mw/Mn thereof were found to be 279,000 and 2.5, respectively. The polyurethane-urea 6 obtained had a content of hard segments of 7.8% by weight.

A film was formed from the thus-obtained polyurethane-urea 6 solution in the same manner as in Example 1 and subjected to the peeling test. As a result, the film had a peel strength of 2.8 g/cm, showing that the film had satisfactory peeling property. The film obtained had the properties shown in Table 1.

Reference Example 1

Production of Polysiloxane Polyol 4

Into a 100-mL four-necked round-bottom flask equipped with a stirrer were introduced 4.2 mg of tetrabutyl orthotitanate (manufactured by Tokyo Kasei Kogyo Co., Ltd.), 62.5 g (34.5 mmol) of a carbinol-modified silicone (KF-6001, manufactured by Shin-Etsu Chemical Co., Ltd.; hydroxyl value, 62), and 10 g (87.6 mmol) of ε-caprolactone (Across). A distillate tube and a nitrogen introduction tube were attached thereto, and the reaction vessel was immersed in an oil bath and thereby heated to 190° C. over 30 minutes. The reaction mixture was reacted at 190° C. for 7 hours to obtain a polysiloxane polyol 4 (number-average molecular weight, 2,100; polydimethylsiloxane content, 77.9% by weight).
<Production of Polyurethane-urea 7>

A solution of a polyurethane-urea 7 was obtained in the same manner as in Example 1, except that the amount of the polytetramethylene ether glycol (number-average molecular weight, 1,972; manufactured by Mitsubishi Chemical Corp.) used as a polyether polyol (b) was changed to 97.6 parts by weight, that the polysiloxane polyol 4 synthesized above was used as a polysiloxane polyol (a) in an amount of 5.14 parts by weight, and that the amount of the MDI used as an isocyanate compound (c) was changed to 21.0 parts by weight. The polyurethane-urea solution obtained was slightly cloudy.

This solution was aged at 25° C. overnight. Thereafter, the polyurethane-urea 7 obtained was examined by GPC. As a result, the Mw and Mw/Mn thereof were found to be 194,000 and 2.5, respectively. The polyurethane-urea 7 obtained had a content of hard segments of 7.8% by weight.

A film was formed from the thus-obtained polyurethane-urea 7 solution in the same manner as in Example 1 and subjected to the peeling test. As a result, the film had a peel strength of 0.6 g/cm, showing that the film had satisfactory peeling property. The film obtained had the properties shown in Table 1.

Reference Example 2

Production of Polysiloxane Polyol 5

A polysiloxane polyol 5 was produced in the same manner as in Reference Example 1, except that the use amount of the tetrabutyl orthotitanate was 4.2 mg, the use amount of the carbinol-modified silicone was changed to 45.0 g (24.9 mmol), and the use amount of the ε-caprolactone was changed to 29.6 g (259 mmol). (The polysiloxane polyol 5 had a number-average molecular weight of 3,001 and a polydimethylsiloxane content of 54.5% by weight).
<Production of Polyurethane-Urea 8>

A satisfactorily transparent solution of a polyurethane-urea 8 was obtained in the same manner as in Example 1, except that the amount of the polytetramethylene ether glycol (number-average molecular weight, 1,972; manufactured by Mitsubishi Chemical Corp.) used as a polyether polyol (b) was changed to 103 parts by weight, that the polysiloxane polyol 5 synthesized above was used as a polysiloxane polyol (a) in an amount of 5.40 parts by weight, and that the amount of the MDI used as an isocyanate compound (c) was changed to 21.6 parts by weight.

This solution was aged at 25° C. overnight. Thereafter, the polyurethane-urea 8 obtained was examined by GPC. As a result, the Mw and Mw/Mn thereof were found to be 219,000 and 2.9, respectively. The polyurethane-urea 8 obtained had a content of hard segments of 7.7% by weight.

A film was formed from the thus-obtained polyurethane-urea 8 solution in the same manner as in Example 1 and subjected to the peeling test. As a result, the film had a peel strength of 1.2 g/cm, showing that the film had satisfactory peeling property. The film obtained had the properties shown in Table 1.

Reference Example 3

Production of Polyurethane-Urea 9

A solution of a polyurethane-urea 9 was obtained in the same manner as in Example 1, except that the amount of the polytetramethylene ether glycol (number-average molecular weight, 1,972; manufactured by Mitsubishi Chemical Corp.) used as a polyether polyol (b) was changed to 105 parts by weight, that a carbinol-modified silicone (KF-6001, manufactured by Shin-Etsu Chemical Co., Ltd.; number-average molecular weight, 1,820) was used as a polysiloxane polyol (a) in an amount of 5.53 parts by weight, and that the amount of the MDI used as an isocyanate compound (c) was changed to 22.7 parts by weight. The polyurethane-urea 9 solution obtained was cloudy.

This solution was aged at 25° C. overnight. Thereafter, the polyurethane-urea 9 obtained was examined by GPC. As a result, the Mw and Mw/Mn thereof were found to be 188,000 and 2.2, respectively. The polyurethane-urea 9 obtained had a content of hard segments of 7.8% by weight.

A film was formed from the thus-obtained polyurethane-urea 9 solution in the same manner as in Example 1 and subjected to the peeling test. As a result, the film had a peel strength of 1.9 g/cm, showing that the film had satisfactory peeling property. The film obtained had the properties shown in Table 1.

Reference Example 4

<Production of Polyurethane-Urea 10>

A satisfactorily transparent solution of a polyurethane-urea 10 was obtained in the same manner as in Example 1, except that the amount of the polytetramethylene ether glycol (number-average molecular weight, 1,972; manufactured by Mitsubishi Chemical Corp.) used as a polyether polyol (b) was changed to 97.4 parts by weight, that a carbinol-modified silicone (KF-6001, manufactured by Shin-Etsu Chemical Co., Ltd.; number-average molecular weight, 1,820) was used as a polysiloxane polyol (a) in an amount of 0.1 part by weight, and that the amount of the MDI used as an isocyanate compound (c) was changed to 20.0 parts by weight.

This solution was aged at 25° C. overnight. Thereafter, the polyurethane-urea 10 obtained was examined by GPC. As a result, the Mw and Mw/Mn thereof were found to be 214,000 and 2.6, respectively. The polyurethane-urea 10 obtained had a content of hard segments of 7.8% by weight. A film was formed from the thus-obtained polyurethane-urea 10 solution in the same manner as in Example 1. The film had the properties shown in Table 1.

Comparative Example 1

Production of Polyurethane-Urea 11

A polyurethane-urea 11 solution was produced in the same manner as in Example 1 according to the composition shown in Table 1 without using any polysiloxane polyol.

This solution was aged at 25° C. overnight. Thereafter, the polyurethane-urea 11 obtained was examined by GPC. As a result, the Mw and Mw/Mn thereof were found to be 217,000 and 2.5, respectively. The polyurethane-urea 11 obtained had a content of hard segments of 7.8% by weight.

A film was formed from the thus-obtained polyurethane-urea 11 solution in the same manner as in Example 1 and subjected to the peeling test. As a result, the film had a peel strength of 46.0 g/cm, showing that the film had poor peeling property. The film obtained had the properties shown in Table 1.

TABLE 1

Compositions and Properties of Polyurethane-ureas

| | | Example 1 | Example 2 | Example 3 | Example 4 | Example 5 | Example 6 |
|---|---|---|---|---|---|---|---|
| Polyurethane-urea Composition of feed materials (parts by weight) | Polysiloxane polyol 1 | 0.55 | | | | 1.16 | |
| | Polysiloxane polyol 2 | | 0.90 | 8.30 | 0.67 | | |
| | Polysiloxane polyol 3 | | | | | | 0.65 |
| | Polysiloxane polyol 4 | | | | | | |
| | Polysiloxane polyol 5 | | | | | | |
| | Polysiloxane polyol 6 | | | | | | |
| | PTMG | 109.2 | 88.6 | 94.8 | 132.7 | 115.3 | 130 |
| | MDI | 22.2 | 18.1 | 20.3 | 27.0 | 23.6 | 26.7 |
| | EDA | 1.64 | 1.26 | 1.46 | 2.06 | 1.87 | 2.01 |
| | DEA | 0.24 | 0.19 | 0.21 | 0.29 | 0.26 | 0.28 |
| Polysiloxane polyol amount in the polyols (wt %) | | 0.5 | 1.0 | 8.3 | 0.5 | 1.0 | 0.5 |
| Hard-segment content in polyurethane-urea (wt %) | | 7.7 | 7.7 | 7.5 | 7.8 | 7.8 | 7.8 |
| Molecular weight of polyurethane-urea (calculated for standard polystyrene) | Mw | 216000 | 191000 | 133000 | 231000 | 229000 | 279000 |
| | Mw/Mn | 2.5 | 2.6 | 2.6 | 2.4 | 2.2 | 2.5 |
| Transparency of polyurethane-urea solution | | good | good | good | good | good | good |
| Relative proportion in film surface | Si/C [atm %/atm %] | 0.120 | — | — | 0.127 | 0.137 | 0.090 |
| Film properties | Strength at 100% elongation (MPa) | 4.3 | 4.0 | 4.3 | 4.0 | 4.0 | 3.8 |
| | Strength at 300% elongation (MPa) | 10.2 | 10.2 | 9.8 | 9.5 | 9.6 | 9 |
| | Strength at rupture (MPa) | 55 | 65 | 65 | 50 | 44 | 47 |
| | Elongation at rupture (%) | 629 | 673 | 767 | 649 | 610 | 658 |
| | Peel strength (g/cm) | 1.0 | 1.1 | 1.6 | 1.1 | 0.4 | 2.8 |

| | | Reference Example 1 | Reference Example 2 | Reference Example 3 | Reference Example 4 | Comparative Example 1 |
|---|---|---|---|---|---|---|
| Polyurethane-urea Composition of feed materials (parts by weight) | Polysiloxane polyol 1 | | | | | |
| | Polysiloxane polyol 2 | | | | | |
| | Polysiloxane polyol 3 | | | | | |
| | Polysiloxane polyol 4 | 5.14 | | | | |
| | Polysiloxane polyol 5 | | 5.40 | | | |
| | Polysiloxane polyol 6 | | | 5.53 | 0.1 | |
| | PTMG | 97.6 | 103 | 105 | 97.4 | 121 |
| | MDI | 21.0 | 21.6 | 22.7 | 20.0 | 24.8 |
| | EDA | 1.27 | 1.22 | 1.62 | 1.41 | 1.91 |
| | DEA | 0.21 | 0.21 | 0.23 | 0.20 | 0.27 |
| Polysiloxane polyol amount in the polyols (wt %) | | 5.0 | 5.0 | 5.0 | 0.1 | 0.0 |
| Hard-segment content in polyurethane-urea (wt %) | | 7.8 | 7.7 | 7.8 | 7.8 | 7.8 |
| Molecular weight of polyurethane-urea (calculated for standard polystyrene) | Mw | 194000 | 219000 | 188000 | 214000 | 217000 |
| | Mw/Mn | 2.5 | 2.9 | 2.2 | 2.6 | 2.5 |
| Transparency of polyurethane-urea solution | | fair | good | poor | good | good |
| Relative proportion in film surface | Si/C [atm %/atm %] | 0.182 | 0.174 | 0.191 | 0.071 | 0.000 |
| Film properties | Strength at 100% elongation (MPa) | 3.6 | 3.3 | 4.0 | 3.7 | 4.1 |
| | Strength at 300% elongation (MPa) | 9.1 | 7.2 | 9.6 | 8.5 | 9.7 |
| | Strength at rupture (MPa) | 45 | 27 | 34 | 36 | 54 |
| | Elongation at rupture (%) | 593 | 587 | 560 | 681 | 651 |
| | Peel strength (g/cm) | 0.6 | 1.2 | 1.9 | 12.3 | 46 |

As shown in Table 1, a comparison between each Example and the Comparative Example shows that polyurethanes having excellent peeling property and transparency were able to be produced in Examples 1 to 6, in each of which a polysiloxane polyol satisfying structural formula (1) was used for polyurethane production. Namely, it was demonstrated that polyurethanes having exceedingly high peeling property as compared with the polyurethane obtained in Comparative Example 1, in which the polyester polyol was not used, can be produced.

It has also become apparent from a comparison between each Example and the Reference Examples that the polyurethanes produced in Examples 1 to 6, in each of which a polysiloxane polyol satisfying structural formula (1) was used for polyurethane production, were superior in peeling property or homogeneity to the polyurethanes obtained in the Reference Examples, in which the polysiloxane polyol was not used.

Furthermore, with respect to a comparison among polyol mixtures having the same polysiloxane polyol content, it was found that the polyurethanes obtained in Examples 1 and 4, in which a polyester polyol produced from a polycarboxylic acid (i-1) having a polysiloxane framework and a plurality of carboxyl groups and from a polyether polyol (ii) was used for polyurethane production, had far higher peeling property and homogeneity than the polyurethane obtained in Example 6, in which a commercial polysiloxane polyol was used.

While the invention has been described in detail and with reference to specific embodiments thereof, it will be apparent to one skilled in the art that various changes and modifications can be made therein without departing from the spirit and scope thereof. This application is based on a Japanese patent application filed on Oct. 30, 2009 (Application No. 2009-251097), a Japanese patent application filed on Jan. 29, 2010 (Application No. 2010-019214), and a Japanese patent application filed on Jan. 29, 2010 (Application No. 2010-019217), the entire contents thereof being incorporated herein by reference.

INDUSTRIAL APPLICABILITY

According to the invention, it is possible to produce a polyester polyol to be used as a raw material for polyurethanes which have high peeling property and excellent homogeneity and which are exceedingly useful in applications such as elastic fibers, films, and clothing. It is also possible to produce a polyurethane and a polyurethane-urea using the polyester polyol.

In addition, when molded polyurethanes such as, for example, elastic fibers and films, are to be produced from the polyurethane and polyurethane-urea obtained, it can be expected to attain a cost reduction due to a reduction in the amount of a finishing oil, smoothing agent, or the like to be used, an improvement in operation stability due to a reduction in the frequency of product staining and clogging of machines and tools, a reduction in electric power for driving machines which is due to a decrease in frictional resistance, etc.

The invention claimed is:

1. A process for producing a polyurethane, which comprises using a polyester polyol (a-1), a polyether polyol (b) other than said polyester polyol (a-1), an isocyanate compound (c) and a chain extender (d) as a raw material to produce a polyurethane, wherein the polyester polyol (a-1) is a polyester polyol (a-1) obtained by forming an ester bond between either a carboxyl group of a polycarboxylic acid (i-1) having a polysiloxane framework and a plurality of carboxyl groups or an ester group of a polycarboxylic acid ester (i-2) having a polysiloxane framework and a plurality of ester groups, and a hydroxyl group of a polyether polyol (ii).

2. The process for producing a polyurethane according to claim 1, which comprises obtaining a mixture of the polyester polyol (a-1) and the polyether polyol (b).

3. The process for producing a polyurethane according to claim 2, which comprises reacting the mixture obtained by the step of obtaining a mixture of the polyester polyol (a-1) and the polyether polyol (b) with the isocyanate compound (c) to obtain a prepolymer having an isocyanate group at both ends thereof.

4. The process for producing a polyurethane according to claim 1, wherein the polyester polyol (a-1) has an ester bond formed between two terminal carboxyl groups in one molecule of the polycarboxylic acid (i-1) having a polysiloxane framework and a plurality of carboxyl groups and terminal hydroxyl groups in two molecules of the polyether polyol (ii).

5. The process for producing a polyurethane according to claim 1, wherein the polyester polyol (a-1) is obtained using polytetramethylene ether glycol as the polyether polyol (ii).

6. The process for producing a polyurethane according to claim 1, wherein the polyester polyol (a-1) has a number-average molecular weight of 1,000-4,000.

7. The process for producing a polyurethane according to claim 1, wherein the polyester polyol (a-1) is used in an amount of 0.1-10% by weight based on the total amount of the polyester polyol (a-1) and the polyether polyol (b) to be used.

8. The process for producing a polyurethane according to claim 1, wherein the isocyanate compound (c) is an aromatic polyisocyanate.

9. The process for producing a polyurethane according to claim 1, wherein the chain extender (d) is a polyamine compound.

10. A polyurethane obtained by the process for producing a polyurethane according to claim 1.

11. A polyurethane film comprising the polyurethane according to claim 10.

12. A polyurethane fiber comprising the polyurethane according to claim 10.

13. A molded object comprising a polyurethane obtained from a polysiloxane polyol (a-2) represented by the following structural formula (1), a polyether polyol (b) other than said polysiloxane polyol (a-2), an isocyanate compound (c) and a chain extender (d), wherein the relative proportion of silicon atoms to carbon atoms in the surface of the molded object, Si/C, is 0.03-0.5:1

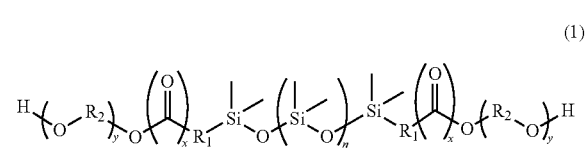

(1)

wherein in formula (1), the two $R_1$ each independently are an alkylene group having 1-15 carbon atoms, the two $R_2$ each independently are an alkylene group having 2-6 carbon atoms, x is an integer of 1, the two y's each independently are an integer of 5-50, and n is an integer of 1-100.

14. The molded object according to claim 13, wherein the polyether polyol (b) is polytetramethylene ether glycol.

15. The molded object according to claim 13, wherein the polysiloxane polyol (a-2) has a number-average molecular weight of 500-5,000.

16. The molded object according to claim 13, wherein the polyisocyanate compound (c) is an aromatic polyisocyanate.

17. The molded object according to claim 13, wherein the chain extender (d) is a polyamine compound.

18. The molded object according to claim 13, which is a polyurethane film.

19. The molded object according to claim 13, which is a polyurethane fiber.

20. The molded object according to claim 13, wherein the polyurethane is a polyurethane obtained by mixing the polysiloxane polyol (a-2) with the polyether polyol (b) to obtain a polyol mixture and then reacting the mixture with the polyisocyanate compound (c) and the chain extender (d).

21. The molded object according to claim 13, wherein the polyurethane is a polyurethane obtained using a polyol mixture prepared by introducing and the polysiloxane polyol (a-2) through a line and the polyether polyol (b) through a separate line and mixing or dispersing polyol (a-2) and polyol (b).

22. A molded object comprising a polyurethane obtained from a polysiloxane polyol (a-2) represented by the following structural formula (I), a polyether polyol (b) other than said polysiloxane polyol (a-2), an isocyanate compound (c) and a chain extender (d), wherein the relative proportion of silicon atoms to carbon atoms in the surface of the molded object, Si/C, is 0.03-0.5:1

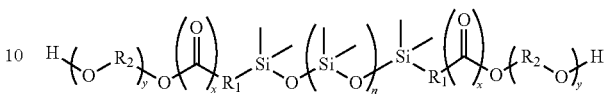

(1)

wherein in formula (I), the two $R_1$ each independently are an alkylene group having 1-15 carbon atoms, the two $R_2$ each independently are an alkylene group having 2-6 carbon atoms, x is 0, the two y's each independently are an integer of 5-50, and n is an integer of 1-100, wherein said molded object is a polyurethane fiber.

23. The molded object according to claim 22, wherein the polyether polyol (b) is polytetramethylene ether glycol.

* * * * *